US009928926B2

(12) United States Patent
McGuire

(10) Patent No.: US 9,928,926 B2
(45) Date of Patent: *Mar. 27, 2018

(54) ACTIVE COOLING OF STRUCTURES IMMERSED IN PLASMA

(71) Applicant: Lockheed Martin Corporation, Bethesda, MD (US)

(72) Inventor: Thomas John McGuire, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 819 days.

This patent is subject to a terminal disclaimer.

(21) Appl. No.: 14/242,912

(22) Filed: Apr. 2, 2014

(65) Prior Publication Data

US 2014/0301517 A1 Oct. 9, 2014

Related U.S. Application Data

(60) Provisional application No. 61/807,932, filed on Apr. 3, 2013, provisional application No. 61/808,136, filed
(Continued)

(51) Int. Cl.
*G21B 1/15* (2006.01)
*G21B 1/05* (2006.01)
*H05H 1/14* (2006.01)

(52) U.S. Cl.
CPC .............. *G21B 1/05* (2013.01); *G21B 1/052* (2013.01); *H05H 1/14* (2013.01); *Y02E 30/122* (2013.01); *Y02E 30/126* (2013.01)

(58) Field of Classification Search
USPC ....................................................... 376/142
See application file for complete search history.

(56) References Cited

U.S. PATENT DOCUMENTS 2,969,308 A 1/1961 Bell
3,005,767 A 10/1961 Boyer
(Continued)

FOREIGN PATENT DOCUMENTS

JP 07-022231 1/1995
JP 07-191169 7/1995
(Continued)

OTHER PUBLICATIONS

T. J. McGuire, U.S. Appl. No. 14/242,939, Patent Application filed Apr. 2, 2014.
(Continued)

*Primary Examiner* — Sean P Burke
(74) *Attorney, Agent, or Firm* — Baker Botts L.L.P.

(57) ABSTRACT

A fusion reactor includes an enclosure having a first end, a second end, and a midpoint substantially equidistant between the first and second ends of the enclosure. The fusion reactor includes two internal magnetic coils suspended within the enclosure and positioned on opposite sides of the midpoint of the enclosure, one or more encapsulating magnetic coils positioned on each side of the midpoint of the enclosure, two mirror magnetic coils positioned on opposite sides of the midpoint of the enclosure, and one or more cooling lines within each of the internal magnetic coils. The cooling lines carry a coolant and are operable to remove heat from the internal magnetic coils. The one or more encapsulating magnetic coils and the two mirror magnetic coils are coaxial with the internal magnetic coils. The magnetic coils are operable, when supplied with electric currents, to form magnetic fields for confining plasma within the enclosure.

13 Claims, 13 Drawing Sheets

Related U.S. Application Data on Apr. 3, 2013, provisional application No. 61/808,122, filed on Apr. 3, 2013, provisional application No. 61/808,131, filed on Apr. 3, 2013, provisional application No. 61/808,110, filed on Apr. 3, 2013, provisional application No. 61/808,066, filed on Apr. 3, 2013, provisional application No. 61/808,093, filed on Apr. 3, 2013, provisional application No. 61/808,089, filed on Apr. 3, 2013, provisional application No. 61/808,101, filed on Apr. 3, 2013, provisional application No. 61/808,154, filed on Apr. 3, 2013.

(56) References Cited

U.S. PATENT DOCUMENTS

| | | | |
|---|---|---|---|
| 3,012,955 A | 12/1961 | Kulsrud et al. | |
| 3,038,099 A | 6/1962 | Baker | |
| 3,069,344 A | 12/1962 | Post | |
| 3,071,525 A | 1/1963 | Christofilos | |
| 3,072,551 A | 1/1963 | Schlelein | |
| 3,141,826 A | 7/1964 | Friedrichs | |
| 3,117,912 A | 12/1964 | Imhoff et al. | |
| 3,218,562 A * | 11/1965 | Serduke | H05H 5/06 376/127 |
| 3,230,418 A | 1/1966 | Dandl | |
| 3,324,316 A | 6/1967 | Cann | |
| 3,361,634 A | 1/1968 | Smullin | |
| 3,655,508 A | 4/1972 | Hirsch | |
| 3,664,921 A | 5/1972 | Christofilos | |
| 3,831,101 A | 8/1974 | Benford | |
| 4,065,351 A | 12/1977 | Jassby et al. | |
| 4,125,431 A | 11/1978 | Flowler | |
| 4,233,537 A | 11/1980 | Limpaecher | |
| 4,252,608 A * | 2/1981 | Baldwin | H05H 1/14 376/127 |
| 4,267,488 A | 5/1981 | Wells | |
| 4,354,998 A | 10/1982 | Ohkawa | |
| 4,401,618 A | 8/1983 | Salisbury | |
| 4,615,861 A | 10/1986 | Fisch | |
| 4,641,060 A | 2/1987 | Dandl | |
| 4,960,990 A | 10/1990 | Lavan | |
| 6,593,539 B1 * | 7/2003 | Miley | G21B 1/03 219/121.36 |
| 7,128,980 B2 | 10/2006 | Schedler | |
| 2005/0279628 A1 | 12/2005 | Vukovic | |
| 2008/0226011 A1 | 9/2008 | Barnes | |
| 2011/0096887 A1 | 4/2011 | Piefer | |
| 2012/0085917 A1 | 4/2012 | Kurunczi | |
| 2014/0301518 A1 | 10/2014 | McGuire | |
| 2014/0301519 A1 | 10/2014 | McGuire | |

FOREIGN PATENT DOCUMENTS

| | | |
|---|---|---|
| JP | 09-005466 | 1/1997 |
| JP | 2001-066389 | 3/2001 |
| JP | 2008-008906 | 1/2008 |
| JP | 2008-516462 | 5/2008 |
| JP | 2008-268191 | 11/2008 |
| JP | 2010-243501 | 10/2010 |
| WO | WO 2013/074666 | 5/2013 |

OTHER PUBLICATIONS

T. J. McGuire, U.S. Appl. No. 14/242,971, Patent Application filed Apr. 2, 2014.

T. J. McGuire, U.S. Appl. No. 14/242,923, Patent Application filed Apr. 2, 2914.

T. J. McGuire, U.S. Appl. No. 14/243,605, Patent Application filed Apr. 2, 2014.

T. J. McGuire, U.S. Appl. No. 14/243,368, Patent Application filed Apr. 2, 2014.

T. J. McGuire, U.S. Appl. No. 14/242,999, Non-final Office Action dated Dec. 11, 2015.

T. J. McGuire, U.S. Appl. No. 14/243,447, Non-final Office Action dated Dec. 11, 2015.

A. I, Morozov, V.V. Savel'ev; Reviews of Topical Problems; On Galateas—magnetic traps with plasma-embedded conductors; 1998 Uspekhi Fizicheskikh Nauk, Russian Academy of Sciences; Physics—Uspekhi 41 (11) 1049-1089, 1998.

Louis C. Burkhardt, Joseph N. DiMarco, and Hugh J. Karr; Plasma Injection and Trapping in a Caulked Stuffed Cusp Magnetic Field; Phys. Fluids 12, 1894 (1969); http://dx.doi.org/10.1063/1.1692757, 1969.

Taijiro Uchida and Riuichi Akiyama; Stable Curved Theta-Pinch Plasma in a Series of Caulked Cusp Fields; Phys. Rev. Lett. 24, 1157, Published May 25, 1970.

Intellectual Property Office of Singapore, Office Action (Written Opinion) re Patent Application No. 11201508212S, dated Jun. 13, 2016.

PCT Notification of Transmittal of Int'l Search Report and Written Opinion of the Int'l Searching Authority, or the Declaration, with attached Int'l Search Report and Written Opinion of the Int'l Searching Authority; Int'l appl. PCT/US2014/032757, Int'l filing date Apr. 3, 2014; Ref. file 068527.0146 (14 pgs), Aug. 22, 2014 (Aug. 22, 2014).

L. Bromberg et al., "Innovative Design Options for Internal Coils", vol. PFC/JA-90-42; Ninth Topical Meeting on the Technology of Fusion Energy, Oak Brook, Illinois, Oct. 7-11, 1990, XP-002727474, pp. 1-8, Oct. 1990 (Oct. 1990).

Imazawa et al, "Spherical Tokamak Generation and Merging on UTST Using Ex-Vessel Poloidal Field Coils Only"; Electrical Engineering in Japan, vol. 179, No. 4, 2012, ISSN: 0424-7760; XP-002727492, pp. 18-24, Jun. 2012 (Jun. 2012).

D.R. Cohn et al., "Advantages of High Field Tokamaks for Fusion Reactor Development", vol. PFC/JA-85-39; Plasma Fusion Center—MIT, Cambridge, MA.; XP-002727475, pp. 1-23, Dec. 1985 (Dec. 1985).

T. J. McGuire, U.S. Appl. No. 14/242,999, Response to Non-final Office Action filed Mar. 11, 2016.

T. J. McGuire, U.S. Appl. No. 14/243,447, Response to Non-final Office Action filed Mar. 11, 2016.

T. J. McGuire, U.S. Appl. No. 14/242,999, Final Office Action dated Apr. 25, 2016.

T. J. McGuire, U.S. Appl. No. 14/243,447, Final Office Action dated Apr. 22, 2016.

Intellectual Property Office of Singapore, Office Action (Written Opinion) re Patent Application No. 11201508213X, dated Jun. 16, 2016.

Intellectual Property Office of Singapore, Examination Report re Patent Application No. 11201508228S, dated Jun. 28, 2016.

PCT Notification of Transmittal of the International Search Report and the Written Opinion of the International Searching Authority, or the Declaration for International application No. PCT/US2014/032754, dated Dec. 11, 2014.

PCT Notification of Transmittal of the International Search Report and the Written Opinion of the International Searching Authority, or the Declaration for International application No. PCT/US2014/032759, dated Dec. 18, 2014.

PCT Notification of Transmittal of the International Search Report and the Written Opinion of the International Searching Authority, or the Declaration for International application No. PCT/US2014/032751, dated Dec. 19, 2014.

PCT Notification of Transmittal of the International Search Report and the Written Opinion of the International Searching Authority, or the Declaration for International application No. PCT/US2014/032772, dated Mar. 19, 2015.

PCT Notification of Transmittal of the International Search Report and the Written Opinion of the International Searching Authority, or the Declaration for International application No. PCT/US2014/032764, dated Mar. 5, 2015.

PCT Notification of Transmittal of the International Search Report and the Written Opinion of the International Searching Authority, or the Declaration for International application No. PCT/US2014/032767, dated Mar. 19, 2015.

(56) References Cited

OTHER PUBLICATIONS

PCT Notification of Transmittal of the International Search Report and the Written Opinion of the International Searching Authority, or the Declaration for International application No. PCT/US2014/032749, dated Dec. 18, 2014.
Response to Final Office Action for U.S. Appl. No. 14/243,447, dated Mar. 31, 2017.
Response to Final Office Action for U.S. Appl. No. 14/242,999, dated May 1, 2017.
Response to Final Office Action for U.S. Appl. No. 14/243,447, dated May 1, 2017.
Response to Non-final Office Action for U.S. Appl. No. 14/242,939, (0106) dated May 9, 2017.
Advisory Action for U.S. Appl. No. 14/242,999, (0107) dated May 12, 2017.
Non-final Office Action for U.S. Appl. No. 14/242,971, (0108) dated May 12, 2017.
Response to Non-final Office Action for U.S. Appl. No. 14/242,923, (0109) dated May 8, 2017.
Non-final Office Action for U.S. Appl. No. 14/243,605, (0111) dated May 10, 2017.
Non-final Office Action for U.S. Appl. No. 14/243,368, (0113) dated May 9, 2017.
Advisory Action for U.S. Appl. No. 14/243,447, (0116) dated May 12, 2017.
Advisory Action for U.S. Appl. No. 14/243,447, (0116) dated Apr. 19, 2017.
Advisory Action for U.S. Appl. No. 14/242,999, (0107) dated Apr. 19, 2017.
IP Australia Examination Report No. 1 for Patent Application No. 2014281140, dated May 18, 2017.
Saudi Arabia First Office Action for Patent Application No. 515361258 (with translation), dated May 23, 2017.
IP Australia Examination Report No. 1 Patent Application No. 2014281138, dated May 3, 2017.
IP Australia Examination Report No. 1 Patent Application No. 2014281139, dated May 4, 2017.
IP Australia Examination Report No. 1 Patent Application No. 2014281141, dated May 4, 2017.
IP Australia Examination Report No. 1 Patent Application No. 2014281142, dated May 4, 2017.
IP Australia Examination Report No. 1 Patent Application No. 2014248145, dated May 4, 2017.
Non-Final Office Action for U.S. Appl. No. 14/242,939, dated Jan. 9, 2017.
Request for Continued Examination with Response for U.S. Appl. No. 14/242,999, dated Jul. 22, 2016.
Final Office Action for U.S. Appl. No. 14/242,999, dated Jan. 31, 2017.
Non-Final Office Action for U.S. Appl. No. 14/242,923, dated Jan. 6, 2017.
Request for Continued Examination with Response for U.S. Appl. No. 14/243,447, dated Jul. 22, 2016.
Final Office Action for U.S. Appl. No. 14/243,447, dated Feb. 1, 2017.
Intellectual Property Office of Singapore, Office Action (Written Opinion) for Patent Application No. 11201508212S, dated Dec. 29, 2016.
Intellectual Property Office of Singapore, Office Action (Notice of Allowance with Written Opinion) for Patent Application No. 11201508213X, dated Jan. 18, 2017.
Intellectual Property Office of Singapore, Office Action (Notice of Eligibility for Grant) for Patent Application No. 11201508213X, dated Jan. 24, 2017.
New Zealand Intellectual Property Office First Examination Report for IP No. 712925 (Examination Report on corresponding U.S. Appl. No. 14/242,912), dated Mar. 15, 2017.
New Zealand Intellectual Property Office First Examination Report for IP No. 712921 (Examination Report on corresponding U.S. Appl. No. 14/242,999), dated Mar. 15, 2017.
Chilean Office Action for PCT/2015-002947 dated Jul. 14, 2017 (with translation), dated Aug. 17, 2017.
Final Office Action; USPTO; U.S. Appl. No. 14/242,939; dated Jul. 5, 2017.
Final Office Action; USPTO; U.S. Appl. No. 14/242,923; dated Aug. 3, 2017.
Response to Non-Final Office Action; USPTO; U.S. Appl. No. 14/243,605; dated Aug. 10, 2017.
Response to Non-Final Office Action; USPTO; U.S. Appl. No. 14/243,368; dated Aug. 9, 2017.
Non Final Office Action; USPTO; U.S. Appl. No. 14/242,971; dated Aug. 4, 2017.
Japanese Office Action; 2016-506595 Notice of Reasons for Rejection; English translation included, dated Jan. 9, 2018.
Japanese Office Action; 2016-506597 Notice of Reasons for Rejection; English translation included, dated Jan. 9, 2018.
Japanese Office Action; 2016-506599; Notice of Reasons for Rejection; English translation included, dated Jan. 9, 2018.
Japanese Office Action; 2016-506596 Notice of Reasons for Rejection; English translation included, dated Jan. 16, 2018.
Japanese Office Action; 2016-506600 Notice of Reasons for Rejection; English translation included, dated Jan. 16, 2018.
Japanese Office Action; 2016-506602; Notice of Reasons for Rejection; English translation included, dated Jan. 16, 2018.
Singapore 11201508217R Office Action (Written Opinion), dated Jan. 8, 2018.
Singapore 11201508226P Office Action (Written Opinion), dated Jan. 8, 2018.

\* cited by examiner

ACTIVE COOLING OF STRUCTURES IMMERSED IN PLASMA

RELATED APPLICATION

This application claims the benefit under 35 U.S.C. § 119(e) of the priority of the following U.S. Provisional Applications filed on Apr. 3, 2013, the entire disclosures of which are hereby incorporated by reference: U.S. Provisional Application No. 61/808,136, entitled "MAGNETIC FIELD PLASMA CONFINEMENT FOR COMPACT FUSION POWER"; U.S. Provisional Application No. 61/808,122, entitled "MAGNETIC FIELD PLASMA CONFINEMENT FOR COMPACT FUSION POWER"; U.S. Provisional Application No. 61/808,131, entitled "ENCAPSULATION AS A METHOD TO ENHANCE MAGNETIC FIELD PLASMA CONFINEMENT"; U.S. Provisional Application No. 61/807,932, entitled "SUPPORTS FOR STRUCTURES IMMERSED IN PLASMA"; U.S. Provisional Application No. 61/808,110, entitled "RESONANT HEATING OF PLASMA WITH HELICON ANTENNAS"; U.S. Provisional Application No. 61/808,066, entitled "PLASMA HEATING WITH RADIO FREQUENCY WAVES"; U.S. Provisional Application No. 61/808,093, entitled "PLASMA HEATING WITH NEUTRAL BEAMS"; U.S. Provisional Application No. 61/808,089, entitled "ACTIVE COOLING OF STRUCTURES IMMERSED IN PLASMA"; U.S. Provisional Application No. 61/808,101, entitled "PLASMA HEATING VIA FIELD OSCILLATIONS"; and U.S. Provisional Application No. 61/808,154, entitled "DIRECT ENERGY CONVERSION OF FUSION PLASMA ENERGY VIA CYCLED ADIABATIC COMPRESSION AND EXPANSION".

TECHNICAL FIELD

This disclosure generally relates to fusion reactors and more specifically to active cooling of structures immersed in plasma.

BACKGROUND

Fusion power is power that is generated by a nuclear fusion process in which two or more atomic nuclei collide at very high speed and join to form a new type of atomic nucleus, A fusion reactor is a device that produces fusion power by confining and controlling plasma. Typical fusion reactors are large, complex, and cannot be mounted on a vehicle. Components of a fusion reactor may heat up during operation. In certain circumstances, these components may need to be cooled so that proper function of the fusion reactor is maintained.

SUMMARY OF EXAMPLE EMBODIMENTS

According to embodiments of the present disclosure, disadvantages and problems associated with previous techniques for actively cooling structures immersed in plasma may be reduced or eliminated.

In some embodiments, a fusion reactor is disclosed. The fusion reactor includes an enclosure having a first end, a second end, and a midpoint substantially equidistant between the first and second ends of the enclosure. The fusion reactor includes two internal magnetic coils suspended within the enclosure and positioned on opposite sided of the midpoint of the enclosure, one or more encapsulating magnetic coils positioned on each side of the midpoint of the enclosure, two mirror magnetic coils positioned on opposite sides of the midpoint of the enclosure, and one or more cooling lines within each of the internal magnetic coils. The cooling lines carry a coolant and are operable to remove heat from the internal magnetic coils. The one or more encapsulating magnetic coils and the two mirror magnetic coils are coaxial with the internal magnetic coils. The magnetic coils are operable, when supplied with electric currents, to form magnetic fields for confining plasma within the enclosure.

Certain embodiments of the present disclosure may provide one or more technical advantages. For example, in certain embodiments of the present disclosure a cooling system may provide active cooling of components of a fusion reactor such as center coils, internal coils, encapsulating coils, and mirror coils. In some embodiments, active cooling may allow for constant feedback on the thermal state of the cooled component, providing an important health-monitoring feedback system. As another example, some embodiments of the present disclosure may allow magnetic coils to be cooled without breaking vacuum. Additionally, some embodiments of the present disclosure may allow magnetic coils to be cooled in steady-state where a coil is continually dumping heat into the coolant. Cooling in steady-state, where small amounts of heat may be steadily removed, may advantageously preserve the thermal operating conditions necessary for operation, Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction. with the accompanying drawings, in which.

DETAILED DESCRIPTION

Embodiments of the present invention and its advantages are best understood by referring to FIGS. 1-13, like numerals being used for like and corresponding parts of the various drawings.

Fusion reactors generate power by confining and controlling plasma that is used in a nuclear fusion process. Typically, fusion reactors are extremely large and complex devices. Because of their prohibitively large sizes, it is not feasible to mount typical fusion reactors on vehicles. As a result, the usefulness of typical fusion reactors is limited.

The teachings of the disclosure recognize that it is desirable to provide a compact fusion reactor that is small enough to mount on or in vehicles such as trucks, trains, aircraft, ships, submarines, spacecraft, and the like. For example, it may be desirable to provide truck-mounted compact fusion reactors that may provide a decentralized power system. As another example, it may be desirable to provide a compact fusion reactor for an aircraft that greatly expands the range and operating time of the aircraft. In addition, it may desirable to provide a fusion reactor that may be utilized in power plants and desalination plants. The following describes an encapsulated linear ring cusp fusion reactor for providing these and other desired benefits associated with compact fusion reactors.

Figure 1:
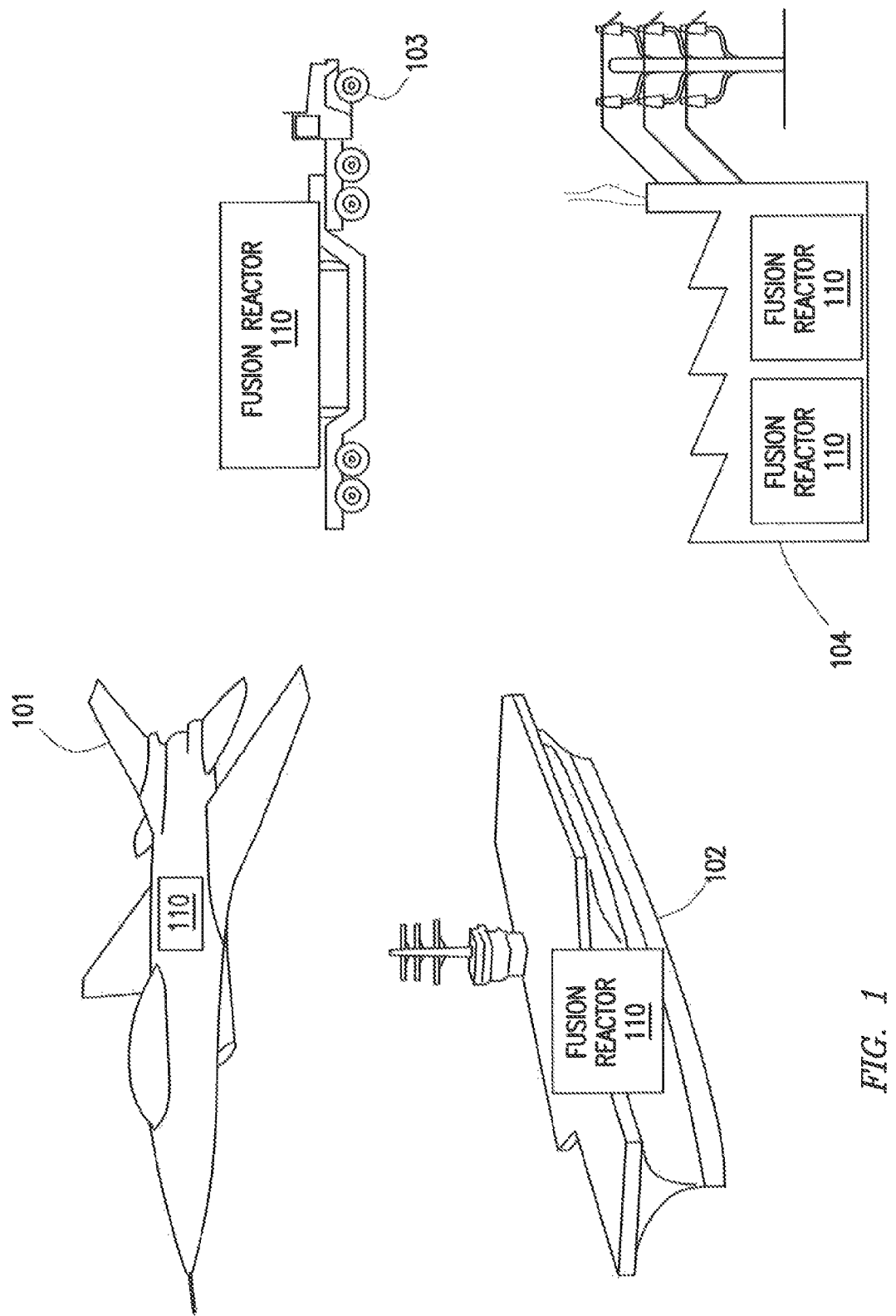
FIG. 1 illustrates example applications for fusion reactors, according to certain embodiments.

FIG. 1 illustrates applications of a fusion reactor 110, according to certain embodiments. As one example, one or more embodiments of fusion reactor 110 are utilized by aircraft 101 to supply heat to one or more engines (e.g., turbines) of aircraft 101. A specific example of utilizing one or more fusion reactors 110 in an aircraft is discussed in more detail below in reference to FIG. 2. In another example, one or more embodiments of fusion reactor 110 are utilized by ship 102 to supply electricity and propulsion power. While an aircraft carrier is illustrated for ship 102 in FIG. 1, any type of ship (e.g., a cargo ship, a cruise ship, etc.) may utilize one or more embodiments of fusion reactor 110. As another example, one or more embodiments of fusion reactor 110 may be mounted to a flat-bed truck 103 in order to provide decentralized power or for supplying power to remote areas in need of electricity. As another example, one or more embodiments of fusion reactor 110 may be utilized by an electrical power plant 104 in order to provide electricity to a power grid. While specific applications for fusion reactor 110 are illustrated in FIG. 1, the disclosure is not limited to the illustrated applications. For example, fusion reactor 110 may be utilized in other applications such as trains, desalination plants, spacecraft, submarines, and the like.

In general, fusion reactor 110 is a device that generates power by confining and controlling plasma that is used in a nuclear fusion process. Fusion reactor 110 generates a large amount of heat from the nuclear fusion process that may be converted into various forms of power. For example, the heat generated by fusion reactor 110 may be utilized to produce steam for driving a turbine and an electrical generator, thereby producing electricity. As another example, as discussed further below in reference to FIG. 2, the heat generated by fusion reactor 110 may be utilized directly by a turbine of a turbofan or fanjet engine of an aircraft instead of a combustor.

Fusion reactor 110 may be scaled to have any desired output for any desired application. For example, one embodiment of fusion reactor 110 may be approximately 10 m×7 m and may have a gross heat output of approximately 100 MW, In other embodiments, fusion reactor 110 may be larger or smaller depending on the application and may have a greater or smaller heat output. For example, fusion reactor 110 may be scaled in size in order to have a gross heat output of over 200 MW.

Figure 2:
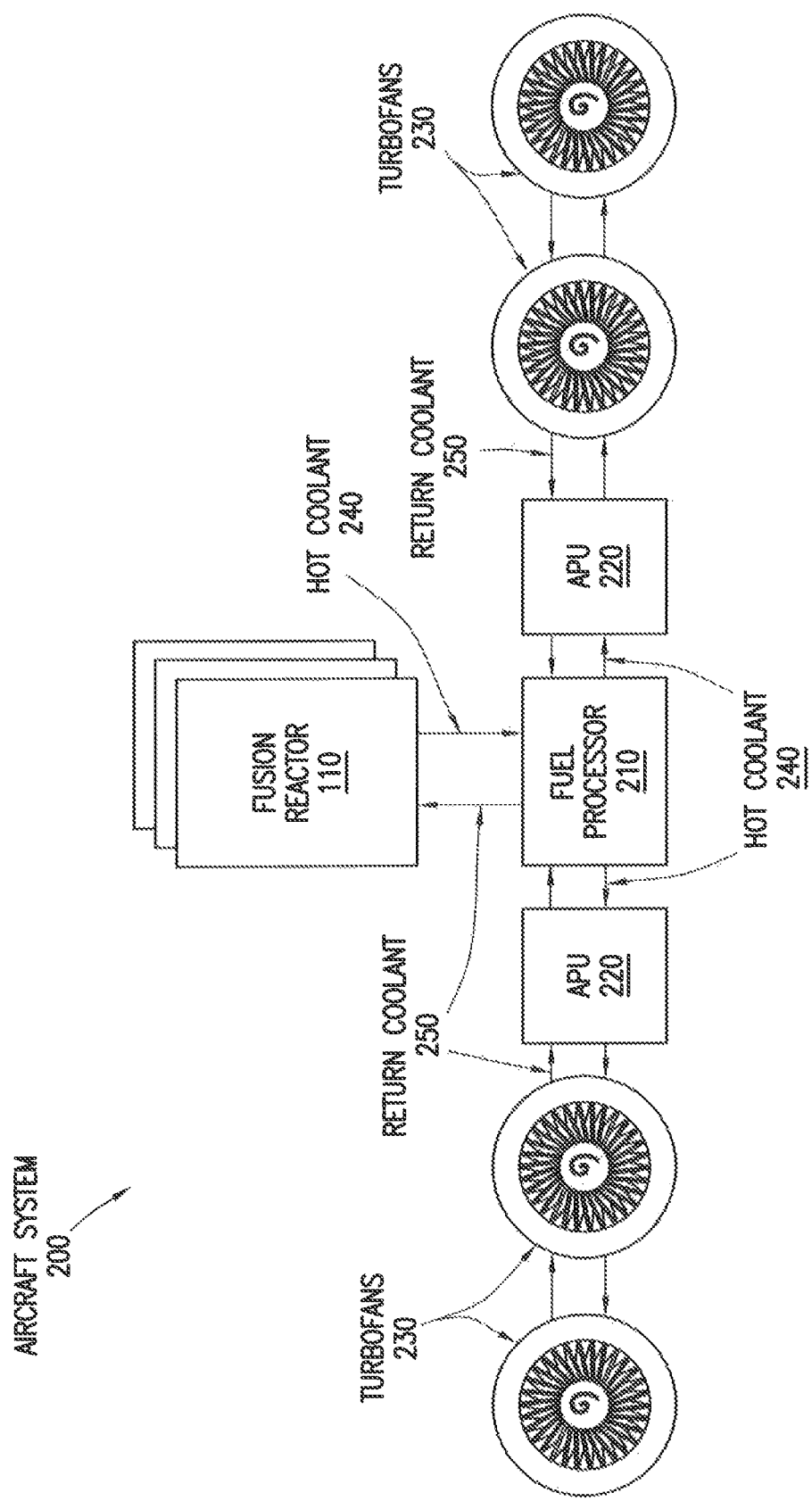
FIG. 2 illustrates an example aircraft system utilizing fusion reactors, according to certain embodiments.

FIG. 2 illustrates an example aircraft system 200 that utilizes one or more fusion reactors 110, according to certain embodiments. Aircraft system 200 includes one or more fusion reactors 110, a fuel processor 210, one or more auxiliary power units (APUs) 220, and one or more turbofans 230. Fusion reactors 110 supply hot coolant 240 to turbofans 230 (e.g., either directly or via fuel processor 210) using one or more heat transfer lines. In some embodiments, hot coolant 240 is FLiBe (i.e., a mixture of lithium fluoride (LiF) and beryllium fluoride (BeF2)) or LiPb. In some embodiments, hot coolant 240 is additionally supplied to APUs 220. Once used by turbofans 240, return coolant 250 is fed back to fusion reactors 110 to be heated and used again. In some embodiments, return coolant 250 is fed directly to fusion reactors 110. In some embodiments, return coolant 250 may additionally be supplied to fusion reactors 110 from APUs 220.

In general, aircraft system 200 utilizes one or more fusion reactors 110 in order to provide heat via hot coolant 240 to turbofans 230. Typically, a turbofan utilizes a combustor that burns jet fuel in order to heat intake air, thereby producing thrust. In aircraft system 200, however, the combustors of turbofans 230 have been replaced by heat exchangers that utilize hot coolant 240 provided by one or more fusion reactors 110 in order to heat the intake air. This may provide numerous advantages over typical turbofans. For example, by allowing turbofans 230 to operate without combustors that burn jet fuel, the range of aircraft 101 may be greatly extended. In addition, by greatly reducing or eliminating the need for jet fuel, the operating cost of aircraft 101 may be significantly reduced.

Figure 3A:
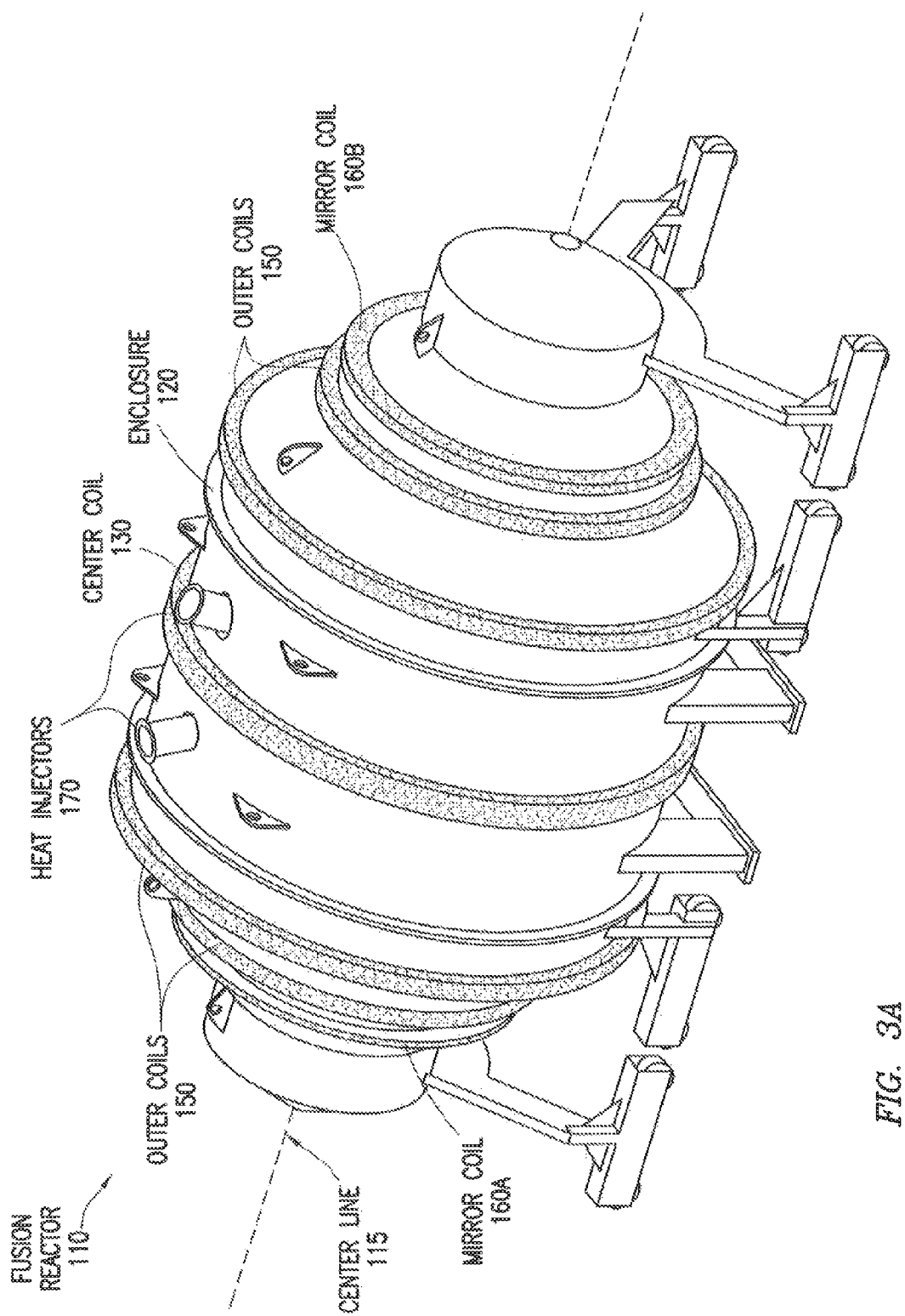
FIGS. 3A and 3B illustrate an example fusion reactor, according to certain embodiments.
Figure 3B:
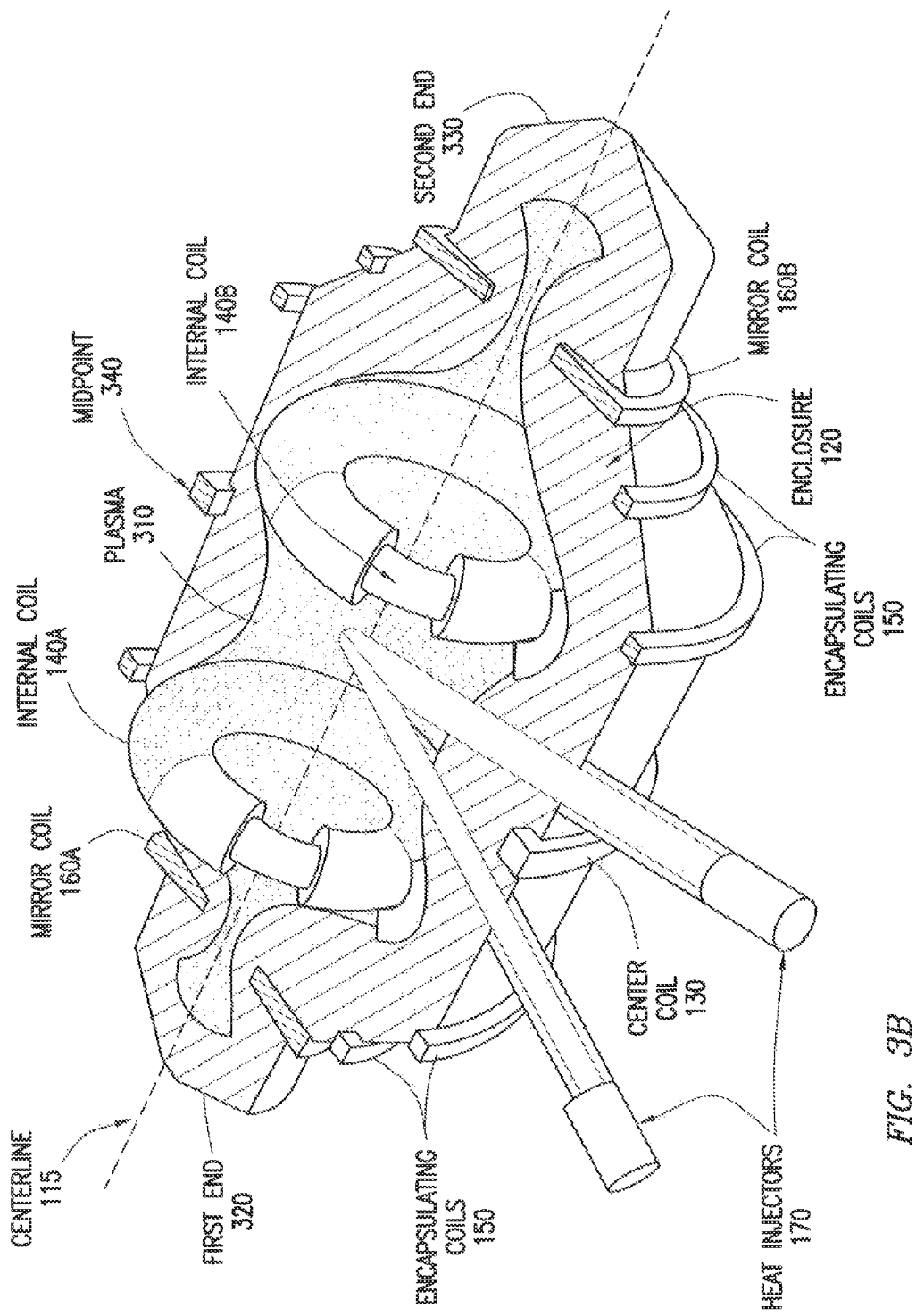

FIGS. 3A and 3B illustrate a fusion reactor 110 that may be utilized in the example applications of FIG. 1, according to certain embodiments. In general, fusion reactor 110 is an encapsulated linear ring cusp fusion reactor in which encapsulating magnetic coils 150 are used to prevent plasma that is generated using internal cusp magnetic coils from expanding. In some embodiments, fusion reactor 110 includes an enclosure 120 with a center line 115 running down the center of enclosure 120 as shown. In some embodiments, enclosure 120 includes a vacuum chamber and has a cross-section as discussed below in reference to FIG. 7. Fusion reactor 100 includes internal coils 140 (e.g., internal coils 140a and 140b, also known as "cusps" coils), encapsulating coils 150, and mirror coils 160 (e.g., mirror coils 160a and 160b). Internal coils 140 are suspended within enclosure 120 by any appropriate means and are centered on center line 115. Encapsulating coils 150 are also centered on center line 115 and may be either internal or external to enclosure 120. For example, encapsulating coils 150 may be suspended within enclosure 120 in some embodiments. In other embodiments, encapsulating coils 150 may be external to enclosure 120 as illustrated in FIGS. 3A and 3B.

In general, fusion reactor 100 provides power by controlling and confining plasma 310 within enclosure 120 for a nuclear fusion process. Internal coils 140, encapsulating coils 150, and mirror coils 160 are energized to form magnetic fields which confine plasma 310 into a shape such as the shape shown in FIGS. 3B and 5. Certain gases, such as deuterium and tritium gases, may then be reacted to make energetic particles which heat plasma 310 and the walls of enclosure 120. The generated heat may then be used, for example, to power vehicles. For example, a liquid metal coolant such as FLiEe or LiPb may carry heat from the walls of fusion reactor 110 out to engines of an aircraft. In some embodiments, combustors in gas turbine engines may be replaced with heat exchangers that utilize the generated heat from fusion reactor 110. In some embodiments, electrical power may also be extracted from fusion reactor 110 via magnets hydrodynamic (MHD) processes.

Fusion reactor 110 is an encapsulated linear ring cusp fusion device. The main plasma confinement is accomplished in some embodiments by a central linear ring cusp (e.g., center coil 130) with two spindle cusps located axially on either side (e.g., internal coils 140). These confinement regions are then encapsulated (e.g., with encapsulating coils 150) within a coaxial mirror field provided by mirror coils 160.

The magnetic fields of fusion reactor 110 are provided by coaxially located magnetic field coils of varying sizes and currents. The ring cusp losses of the central region are mitigated by recirculation into the spindle cusps. This recirculating flow is made stable and compact by the encapsulating fields provided by encapsulating coils 150. The outward diffusion losses and axial losses from the main confinement zones are mitigated by the strong mirror fields of the encapsulating field provided by encapsulating coils 150. To function as a fusion energy producing device, heat is added to the confined plasma 310, causing it to undergo fusion reactions and produce heat. This heat can then be harvested to produce useful heat, work, and/or electrical power.

Fusion reactor 110 is an improvement over existing systems in part because global. MHD stability can be preserved and the losses through successive confinement zones are more isolated due to the scattering of particles moving along the null lines. This feature means that particles moving along the center line are not likely to pass immediately out of the system, but will take many scattering events to leave the system. This increases their lifetime in the device, increasing the ability of the reactor to produce useful fusion power, Fusion reactor 110 has novel magnetic field configurations that exhibit global MHD stability, has a minimum of particle losses via open field lines, uses all of the available magnetic field energy, and has a greatly simplified engineering design. The efficient use of magnetic fields means the disclosed embodiments may be an order of magnitude smaller than typical systems, which greatly reduces capital costs for power plants. In addition, the reduced costs allow the concept to be developed faster as each design cycle may be completed much quicker than typical system. In general, the disclosed embodiments have a simpler, more stable design with far less physics risk than existing systems.

Enclosure 120 is any appropriate chamber or device for containing a fusion reaction. In some embodiments, enclosure 120 is a vacuum chamber that is generally cylindrical in shape. In other embodiments, enclosure 120 may be a shape other than cylindrical. In some embodiments, enclosure 120 has a centerline 115 running down a center axis of enclosure 120 as illustrated. In some embodiments, enclosure 120 has a first end 320 and a second end 330 that is opposite from first end 320. In some embodiments, enclosure 120 has a midpoint 340 that is substantially equidistant between first end 320 and second end 330. A cross-section of a particular embodiment of enclosure 120 is discussed below in reference to FIG. 8.

Some embodiments of fusion reactor 110 may include a center coil 130. Center coil 130 is generally located proximate to midpoint 340 of enclosure 120. In some embodiments, center coil 130 is centered on center line 115 and is coaxial with internal coils 140. Center coil 130 may be either internal or external to enclosure 120, may be located at any appropriate axial position with respect to midpoint 340, may have any appropriate radius, may carry any appropriate current, and may have any appropriate ampturns.

Internal coils 140 are any appropriate magnetic coils that are suspended or otherwise positioned within enclosure 120. In some embodiments, internal coils 140 are superconducting magnetic coils. In some embodiments, internal coils 140 are toroidal in shape as shown in FIG. 3B. In some embodiments, internal coils 140 are centered on centerline 115. In some embodiments, internal coils 140 include two coils: a first internal coil 140a that is located between midpoint 340 and first end 320 of enclosure 120, and a second internal coil 140b that is located between midpoint 340 and second end 330 of enclosure 120. Internal coils 140 may be located at any appropriate axial. position with respect to midpoint 340, may have any appropriate radius, may carry any appropriate current, and may have any appropriate ampturns. A particular embodiment of an internal coil 140 is discussed in more detail below in reference to FIG. 7.

Encapsulating coils 150 are any appropriate magnetic coils and generally have larger diameters than internal coils 140. In some embodiments, encapsulating coils 150 are centered on centerline 115 and are coaxial with internal coils 140. In general, encapsulating coils 150 encapsulate internal coils 140 and operate to close the original magnetic lines of internal coils 140 inside a magnetosphere. Closing these lines may reduce the extent of open field lines and reduce losses via recirculation. Encapsulating coils 150 also preserve the MHD stability of fusion reactor 110 by maintaining a magnetic wall that prevents plasma 310 from expanding. Encapsulating coils 150 have any appropriate crosssection, such as square or round. In some embodiments, encapsulating coils 150 are suspended within enclosure 120. In other embodiments, encapsulating coils 150 may be external to enclosure 120 as illustrated in FIGS. 3A and 3B. Encapsulating coils 150 may be located at any appropriate axial position with respect to midpoint 340, may have any appropriate radius, may carry any appropriate current, and may have any appropriate ampturns.

Fusion reactor 110 may include any number and arrangement of encapsulating coils 150. In some embodiments, encapsulating coils 150 include at least one encapsulating coil 150 positioned on each side of midpoint 340 of enclosure 120. For example, fusion reactor 110 may include two encapsulating coils 150: a first encapsulating coil 150 located between midpoint 340 and first end 320 of enclosure 120, and a second encapsulating coil 150 located between midpoint 340 and second end 330 of enclosure 120. In some embodiments, fusion reactor 110 includes a total of two, four, six, eight, or any other even number of encapsulating coils 150. In certain embodiments, fusion reactor 110 includes a first set of two encapsulating coils 150 located between internal coil 140a and first end 320 of enclosure 120, and a second set of two encapsulating coils 150 located between internal coil 140b and second end 330 of enclosure 120. While particular numbers and arrangements of encapsulating coils 150 have been disclosed, any appropriate number and arrangement of encapsulating coils 150 may be utilized by fusion reactor 110.

Mirror coils 160 are magnetic coils that are generally located close to the ends of enclosure 120 (i.e., first end 320 and second end 330). In some embodiments, mirror coils 160 are centered on center line 115 and are coaxial with internal coils 140. In general, mirror coils 160 serve to decrease the axial cusp losses and make all the recirculating field lines satisfy an average minimum-$\beta$, a condition that is not satisfied by other existing recirculating schemes. In some embodiments, mirror coils 160 include two mirror coils 160: a first mirror coil 160a located proximate to first end 320 of enclosure 120, and a second mirror coil 160b located proximate to second end 330 of enclosure 120. Mirror coils 160 may be either internal or external to enclosure 120, may be located at any appropriate axial position with respect to midpoint 340, may have any appropriate radius, may carry any appropriate current, and may have any appropriate ampturns.

In some embodiments, coils 130, 140, 150, and 160 are designed or chosen according to certain constraints. For example, coils 130, 140, 150, and 160 may be designed according to constraints including: high required currents (maximum in some embodiments of approx. 10 MegaAmp-turns); steady-state continuous operation; vacuum design (protected from plasma impingement), toroidal shape, limit outgassing; materials compatible with 150C bakeout; thermal build-up; and cooling between shots.

Fusion reactor 110 may include one or more heat injectors 170. Heat injectors 170 are generally operable to allow any appropriate heat to be added to fusion reactor 110 in order to heat plasma 310. In some embodiments, for example, heat injectors 170 may be utilized to add neutral beams in order to heat plasma 310 within fusion reactor 110.

In operation, fusion reactor 110 generates fusion power by controlling the shape of plasma 310 for a nuclear fusion process using at least internal coils 140, encapsulating coils 150, and mirror coils 160. Internal coils 140 and encapsulating coils 150 are energized to form magnetic fields which confine plasma 310 into a shape such as the shape shown in FIGS. 3B and 5. Gases such as deuterium and tritium may then be reacted to make energetic particles which heat plasma 310 and the walls of enclosure 120. The generated heat may then be used for power. For example, a liquid metal coolant may carry heat from the walls of the reactor out to engines of an aircraft. In some embodiments, electrical power may also be extracted from fusion reactor 110 via MHD.

In order to expand the volume of plasma 310 and create a more favorable minimum-$\beta$ geometry, the number of internal coils can be increased to make a cusp. In some embodiments of fusion reactor 110, the sum of internal coils 140, center coil 130, and mirror coils 160 is an odd number in order to obtain the encapsulation by the outer 'solenoid' field (i.e., the magnetic field provided by encapsulating coils 150). This avoids making a ring cusp field and therefor ruining the encapsulating separatrix. Two internal coils 140 and center coil 130 with alternating polarizations give a magnetic well with minimum-$\beta$ characteristics within the cusp and a quasi-spherical core plasma volume. The addition of two axial 'mirror' coils (i.e., mirror coils 160) serves to decrease the axial cusp losses and more importantly makes the recirculating field lines satisfy average minimum-$\beta$, a condition not satisfied by other existing recirculating schemes. In some embodiments, additional pairs of internal coils 140 could be added to create more plasma volume in the well. However, such additions may increase the cost and complexity of fusion reactor 110 and may require additional supports for coils internal to plasma 310.

In the illustrated embodiments of fusion reactor 110, only internal coils 140 are within plasma 310. In some embodiments, internal coils 140 are suspending within enclosure 120 by one or more supports, such as support 750 illustrated in FIG. 7. While the supports sit outside the central core plasma well, they may still experience high plasma fluxes. Alternatively, internal coils 140 of some embodiments may be amenable to levitation, which would remove the risk and complexity of having support structures within plasma 310.

Figure 4:
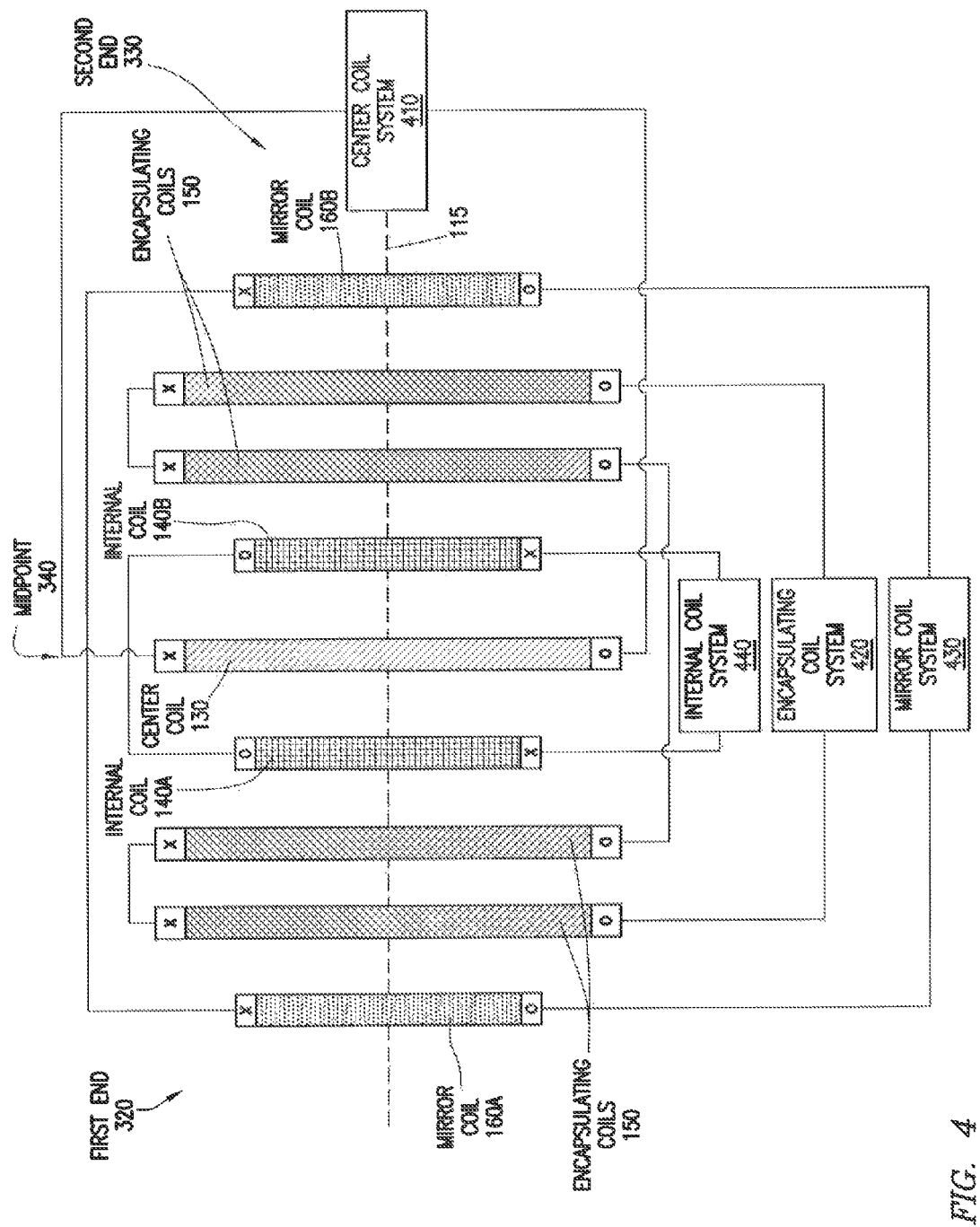
FIG. 4 illustrates a simplified view of the coils and example systems for energizing the coils of the fusion reactor of FIGS. 3A and 3B, according to certain embodiments.

FIG. 4 illustrates a simplified view of the coils of fusion reactor 110 and example systems for energizing the coils. In this embodiment, the field geometry is sized to be the minimum size necessary to achieve adequate ion magnetization with fields that can be produced by simple magnet technology. Adequate ion magnetization was considered to be ~5 ion gyro radii at design average ion energy with respect to the width of the recirculation zone. At the design energy of 100 eV plasma temperature there are 13 ion diffusion jumps and at full 20 KeV plasma energy there are 6.5 ion jumps. This is the lowest to maintain a reasonable magnetic field of 2.2 T in the cusps and keep a modest device size, As illustrated in FIG. 4, certain embodiments of fusion reactor 110 include two mirror coils 160: a first mirror coil 160a located proximate to first end 320 of the enclosure and a second magnetic coil 160b located proximate to second end 330 of enclosure 120. Certain embodiments of fusion reactor 110 also include a center coil 130 that is located proximate to midpoint 340 of enclosure 120. Certain embodiments of fusion reactor 110 also include two internal coils 140: a first internal coil 140a located between center coil 130 and first end 320 of enclosure 120, and a second internal coil 140b located between center coil 130 and second end 330 of enclosure 120. In addition, certain embodiments of fusion reactor 110 may include two or more encapsulating coils 150. For example, fusion reactor 110 may include a first set of two encapsulating coils 150 located between first internal coil 140a and first end 320 of enclosure 120, and a second set of two encapsulating coils 150 located between second internal coil 140b and second end 330 of enclosure 120. In some embodiments, fusion reactor 110 may include any even number of encapsulating coils 150. In some embodiments, encapsulating coils 150 may be located at any appropriate position along center line 115 other than what is illustrated in FIG. 4. In general, encapsulating coils 150, as well as internal coils 140 and mirror coils 160, may be located at any appropriate position along center line 115 in order to maintain magnetic fields in the correct shape to achieve the desired shape of plasma 310.

In some embodiments, electrical currents are supplied to coils 130, 140, 150, and 160 as illustrated in FIG. 4. In this figure, each coil has been split along center line 115 and is represented by a rectangle with either an "X" or an "O" at each end. An "X" represents electrical current that is flowing into the plane of the paper, and an "O" represents electrical current that is flowing out the plane of the paper. Using this nomenclature, FIG. 4 illustrates how in this embodiment of fusion reactor 110, electrical currents flow in the same direction through encapsulating coils 150, center coil 130, and mirror coils 160 (i.e., into the plane of the paper at the top of the coils), but flow in the opposite direction through internal coils 140 (i.e., into the plane of the paper at the bottom of the coils).

In some embodiments, the field geometry of fusion reactor 110 may be sensitive to the relative currents in the coils, but the problem can be adequately decoupled to allow for control. First, the currents to opposing pairs of coils can be driven in series to guarantee that no asymmetries exist in the axial direction. The field in some embodiments is most sensitive to the center three coils (e.g., internal coils 140 and center coil 130). With the currents of internal coil 140 fixed, the current in center coil 130 can be adjusted to tweak the shape of the central magnetic well. This region can be altered into an axial-oriented 'bar-bell' shape by increasing the current on center coil 130 as the increase in flux 'squeezes' the sphere into the axial shape. Alternatively, the current on center coil 130 can be reduced, resulting in a ring-shaped magnetic well at midpoint 340. The radius of center coil 130 also sets how close the ring cusp null-line comes to internal coils 140 and may be chosen in order to have this null line close to the middle of the gap between center coil 130 and internal coils 140 to improve confinement.

The radius of internal coils 140 serves to set the balance of the relative field strength between the point cusps and the ring cusps for the central well. The baseline sizes may be chosen such that these field values are roughly equal. While it would be favorable to reduce the ring cusp losses by increasing the relative flux in this area, a balanced approach may be more desirable.

In some embodiments, the magnetic field is not as sensitive to mirror coils 160 and encapsulating coils 150, but their dimensions should be chosen to achieve the desired shape of plasma 310. In some embodiments, mirror coils 160 may be chosen to be as strong as possible without requiring more complex magnets, and the radius of mirror coils 160 may be chosen to maintain good diagnostic access to the device center. Some embodiments may benefit from shrinking mirror coils 160, thereby achieving higher mirror ratios for less current but at the price of reduced axial diagnostic access.

In general, encapsulating coils 150 have weaker magnetic fields than the other coils within fusion reactor 110. Thus, the positioning of encapsulating coils 150 is less critical than the other coils. In some embodiments, the positions of encapsulating coils 150 are defined such that un-interrupted access to the device core is maintained for diagnostics. In some embodiments, an even number of encapsulating coils 150 may be chosen to accommodate supports for internal coils 140. The diameters of encapsulating coils 150 are generally greater than those of internal coils 140, and may be all equal for ease of manufacture and common mounting on or in a cylindrical enclosure 120. In some embodiments, encapsulating coils 150 may be moved inward to the plasma boundary, but this may impact manufacturability and heat transfer characteristics of fusion reactor 110.

In some embodiments, fusion reactor 110 includes various systems for energizing center coil 130, internal coils 140, encapsulating coils 150, and mirror coils 160. For example, a center coil system 410, an encapsulating coil system 420, a mirror coil system 430, and an internal coil system 440 may be utilized in some embodiments. Coil systems 410-440 and coils 130-160 may be coupled as illustrated in FIG. 4. Coil systems 410-440 may be any appropriate systems for driving any appropriate amount of electrical currents through coils 130-160. Center coil system 410 may be utilized to drive center coil 130, encapsulating coil system 420 may be utilized to drive encapsulating coils 150, mirror coil system 430 may be utilized to drive mirror coils 160, and internal coil system 440 may be utilized to drive internal coils 140. In other embodiments, more or fewer coil systems may be utilized than those illustrated in FIG. 4. In general, coil systems 410-440 may include any appropriate power sources such as battery banks.

Figure 5:
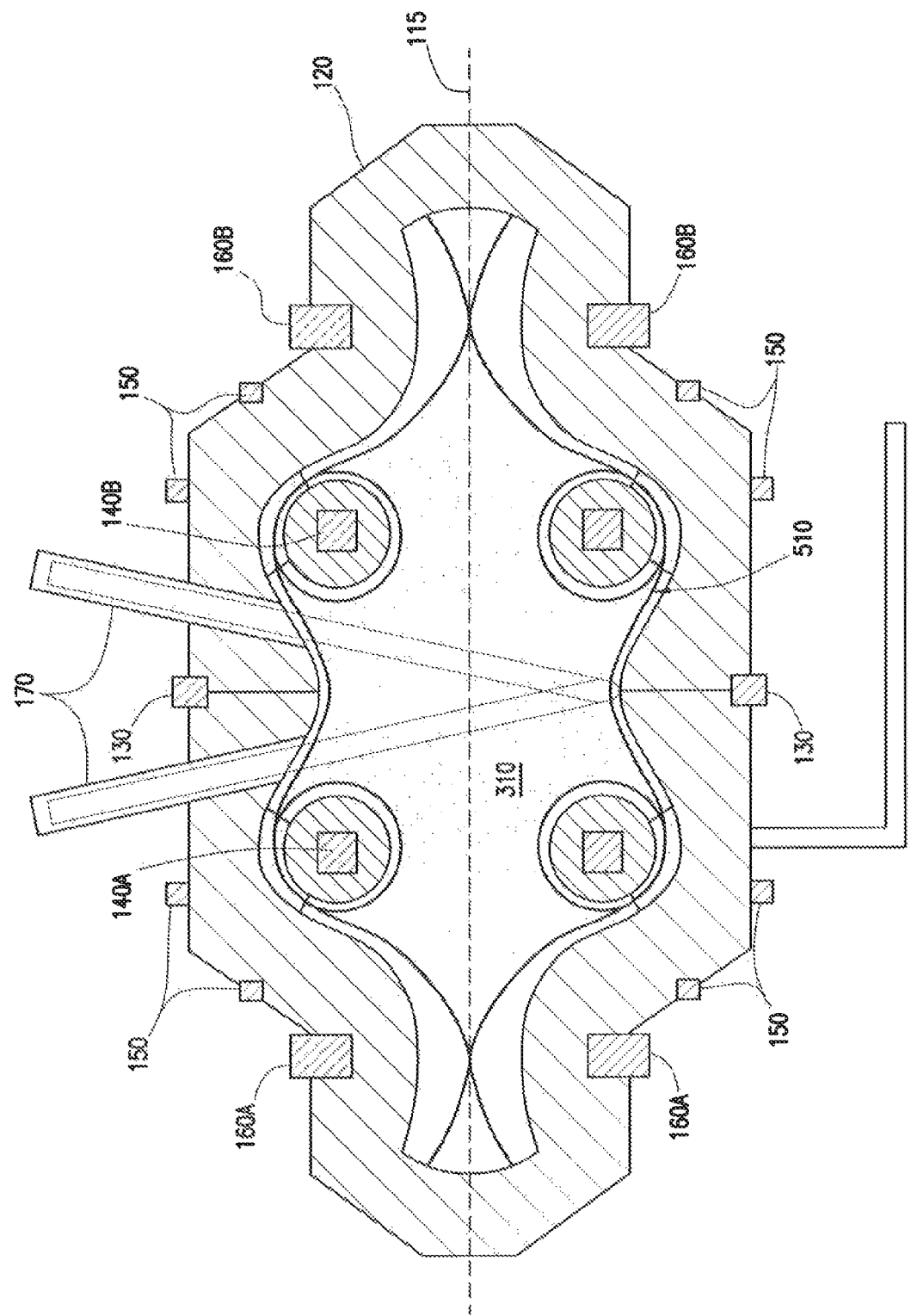
FIG. 5 illustrates plasma within the fusion reactor of FIGS. 3A and 3B, according to certain embodiments.

FIG. 5 illustrates plasma 310 within enclosure 120 that is shaped and confined by center coil 130, internal coils 140, encapsulating coils 150, and mirror coils 160. As illustrated, an external mirror field is provided by mirror coils 160. The ring cusp flow is contained inside the mirror. A trapped magnetized sheath 510 that is provided by encapsulating coils 150 prevents detachment of plasma 310. Trapped magnetized sheath 510 is a magnetic wall that causes plasma 310 to recirculate and prevents plasma 310 from expanding outward. The recirculating flow is thus forced to stay in a stronger magnetic field. This provides complete stability in a compact and efficient cylindrical geometry. Furthermore, the only losses from plasma exiting fusion reactor 110 are at two small point cusps at the ends of fusion reactor 110 along center line 115. This is an improvement over typical designs in which plasma detaches and exits at other locations.

The losses of certain embodiments of fusion reactor 110 are also illustrated in FIG. 5. As mentioned above, the only losses from plasma exiting fusion reactor 110 are at two small point cusps at the ends of fusion reactor 110 along center line 115. Other losses may include diffusion losses due to internal coils 140 and axial cusp losses. In addition, in embodiments in which internal coils 140 are suspended within enclosure 120 with one or more supports (e.g., "stalks"), fusion reactor 110 may include ring cusp losses due to the supports.

In some embodiments, internal coils 140 may be designed in such a way as to reduce diffusion losses. For example, certain embodiments of fusion reactor 110 may include internal coils 140 that are configured to conform to the shape of the magnetic field. This may allow plasma 310, which follows the magnetic field lines, to avoid touching internal coils 140, thereby reducing or eliminating losses. An example embodiment of internal coils 140 illustrating a conformal shape is discussed below in reference to FIG. 7.

Figure 6:
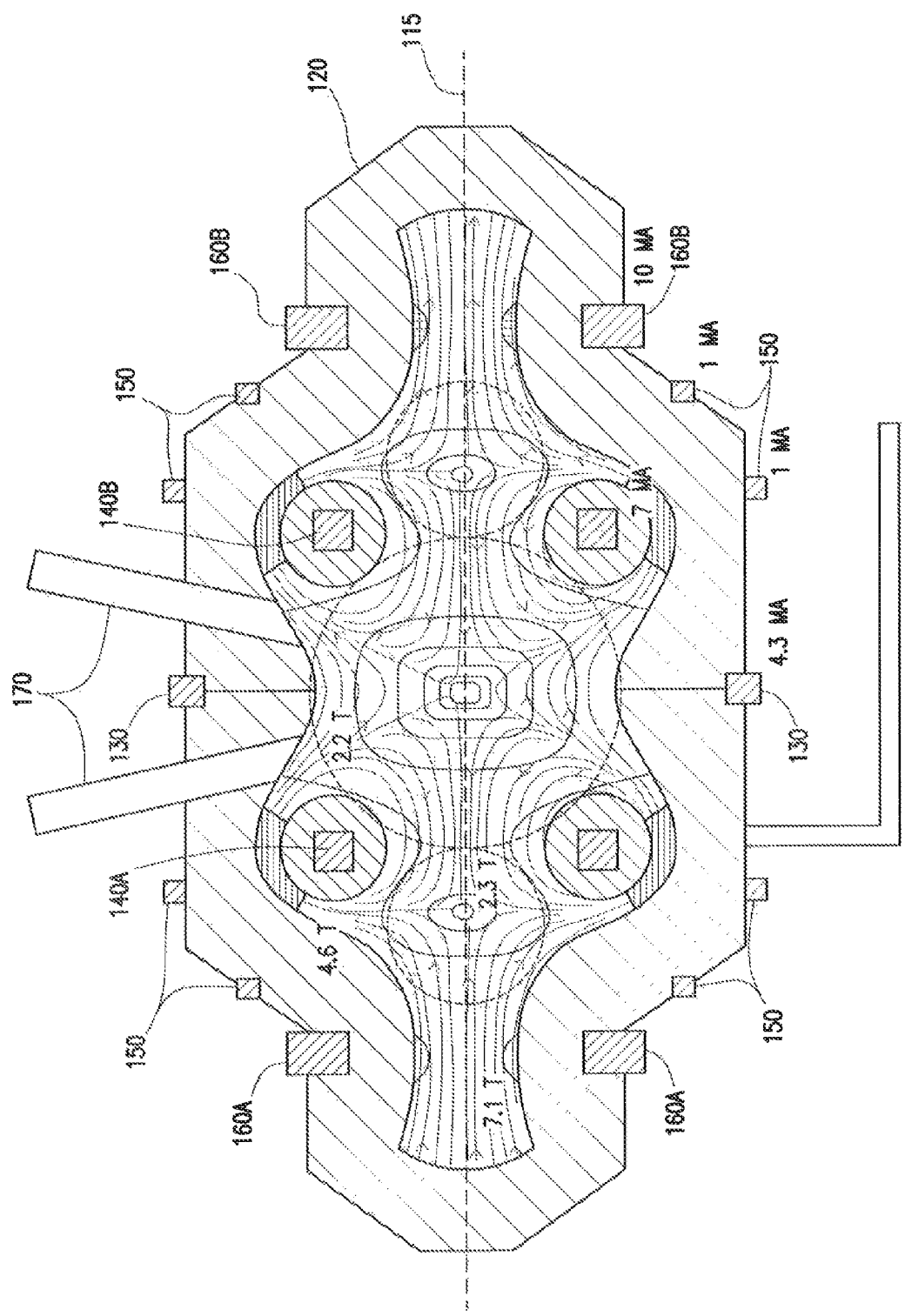
FIG. 6 illustrates magnetic fields of the fusion reactor of FIGS. 3A and 3B, according to certain embodiments.

FIG. 6 illustrates a magnetic field of certain embodiments of fusion reactor 110. In general, fusion reactor 110 is designed to have a central magnetic well that is desired for high beta operation and to achieve higher plasma densities. As illustrated in FIG. 6, the magnetic field may include three magnetic wells. The central magnetic well can expand with high Beta, and fusion occurs in all three magnetic wells. Another desired feature is the suppression of ring cusp losses. As illustrated in FIG. 6, the ring cusps connect to each other and recirculate. In addition, good MHD stability is desired in all regions. As illustrated in FIG. 6, only two field penetrations are needed and MHD interchange is satisfied everywhere.

In some embodiments, the magnetic fields can be altered without any relocation of the coils by reducing the currents, creating for example weaker cusps and changing the balance between the ring and point cusps. The polarity of the currents could also be reversed to make a mirror-type field and even an encapsulated mirror. In addition, the physical locations of the coils could be altered.

Figure 7:
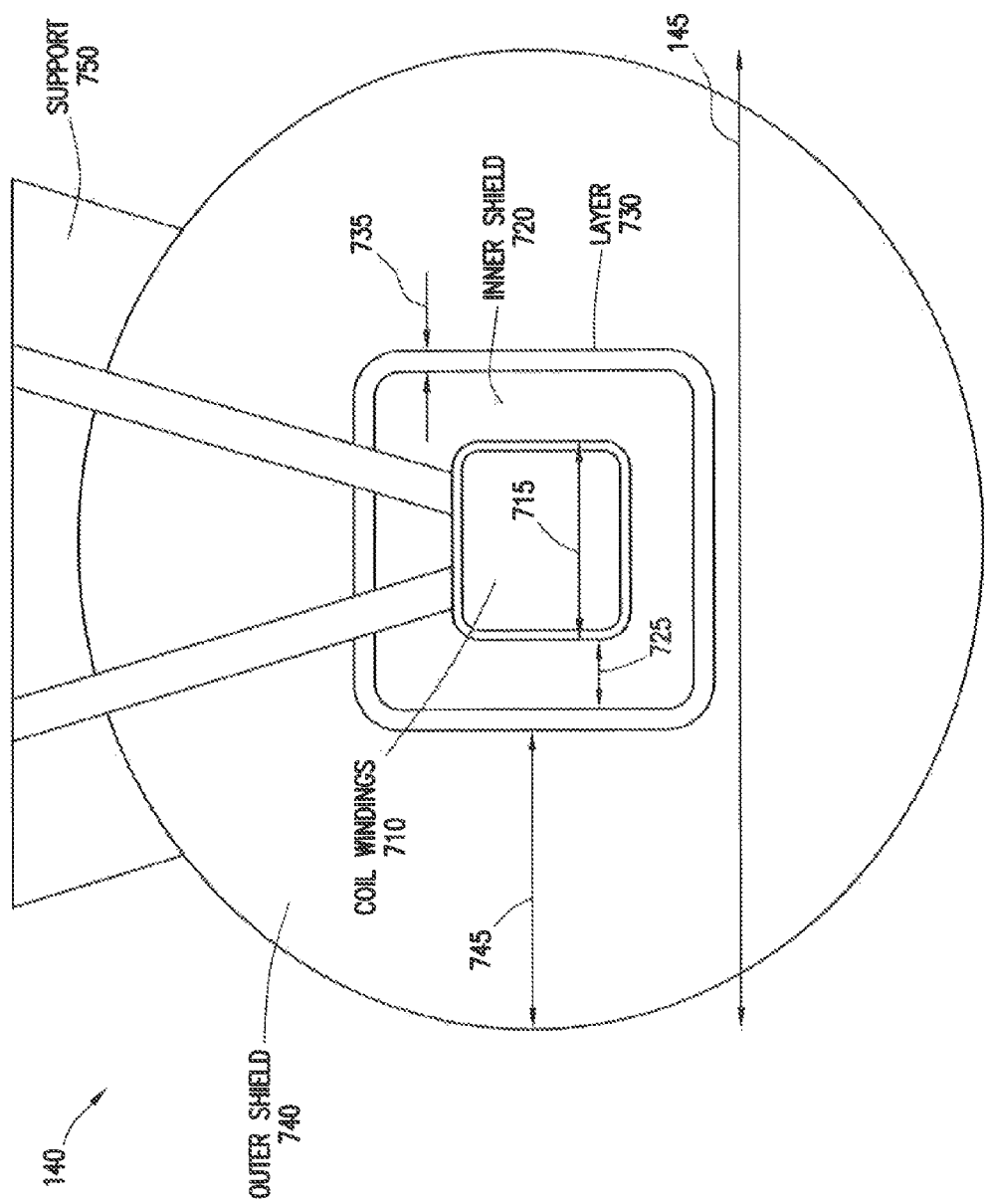
FIG. 7 illustrates an internal coil of the fusion reactor of FIGS. 3A and 3B, according to certain embodiments.

FIG. 7 illustrates an example embodiment of an internal coil 140 of fusion reactor 110. In this embodiment, internal coil 140 includes coil windings 710, inner shield 720, layer 730, and outer shield 740. In some embodiments, internal coil 140 may be suspending within enclosure 120 with one or more supports 750. Coil windings 710 may have a width 715 and may be covered in whole or in part by inner shield 720. Inner shield 720 may have a thickness 725 and may be covered in whole or in part by layer 730. Layer 730 may have a thickness 735 and may be covered in whole or in part by outer shield 740. Outer shield may have a thickness 745 and may have a shape that is conformal to the magnetic field within enclosure 120. In some embodiments, internal coil 140 may have an overall diameter of approximately 1.04 m.

Coil windings 710 form a superconducting coil and carry an electric current that is typically in an opposite direction from encapsulating coils 150, center coil 130, and mirror coils 160. In some embodiments, width 715 of coils winding is approximately 20 cm. Coil windings 710 may be surrounded by inner shield 720. Inner shield 720 provides structural support, reduces residual neutron flux, and shields against gamma rays due to impurities. Inner shield 720 may be made of Tungsten or any other material that is capable of stopping neutrons and gamma rays. In some embodiments, thickness 725 of inner shield 720 is approximately 11.5 cm.

In some embodiments, inner shield 720 is surrounded by layer 730. Layer 730 may be made of lithium (e.g., lithium-6) and may have thickness 735 of approximately 5 mm. Layer 730 may be surrounded by outer shield 740. Outer shield 740 may be made of FLiBe and may have thickness 745 of approximately 30 cm. In some embodiments, outer shield may be conformal to magnetic fields within enclosure 120 in order to reduce losses. For example, outer shield 740 may form a toroid.

Figure 8:
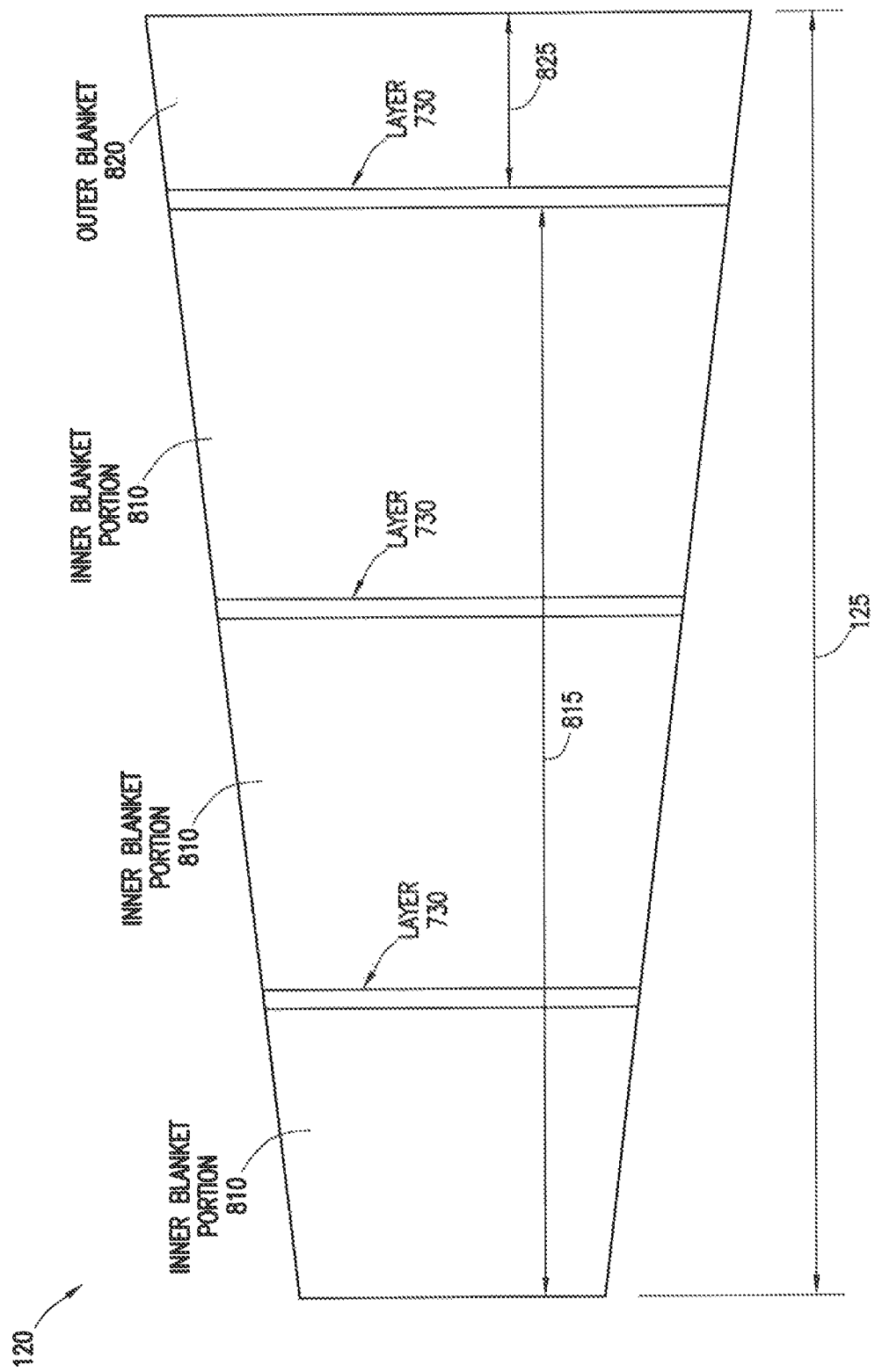
FIG. 8 illustrates a cut-away view of the enclosure of the fusion reactor of FIGS. 3A and 3B, according to certain embodiments.

FIG. 8 illustrates a cut-away view of enclosure 120 of certain embodiments of fusion reactor 110. In some embodiments, enclosure 120 includes one or more inner blanket portions 810, an outer blanket 820, and one or more layers 730 described above. In the illustrated embodiment, enclosure 120 includes three inner blanket portions 810 that are separated by three layers 730. Other embodiments may have any number or configuration of inner blanket portions 810, layers 730, and outer blanket 820. In some embodiments, enclosure 120 may have a total thickness 125 of approximately 80 cm in many locations, in other embodiments, enclosure 120 may have a total thickness 125 of approximately 1.50 m in many locations. However, thickness 125 may vary over the length of enclosure 120 depending on the shape of the magnetic field within enclosure 120 (i.e., the internal shape of enclosure 120 may conform to the magnetic field as illustrated in FIG. 3B and thus many not be a uniform thickness 125).

In some embodiments, inner blanket portions 810 have a combined thickness 815 of approximately 70 cm. In other embodiments, inner blanket portions 810 have a combined thickness 815 of approximately 126 cm. In some embodiments, inner blanket portions are made of materials such as Be, FLiBe, and the like.

Outer blanket 820 is any low activation material that does not tend to become radioactive under irradiation. For example, outer blanket 820 may be iron or steel. In some embodiments, outer blanket 820 may have a thickness 825 of approximately 10 cm.

Figure 9:
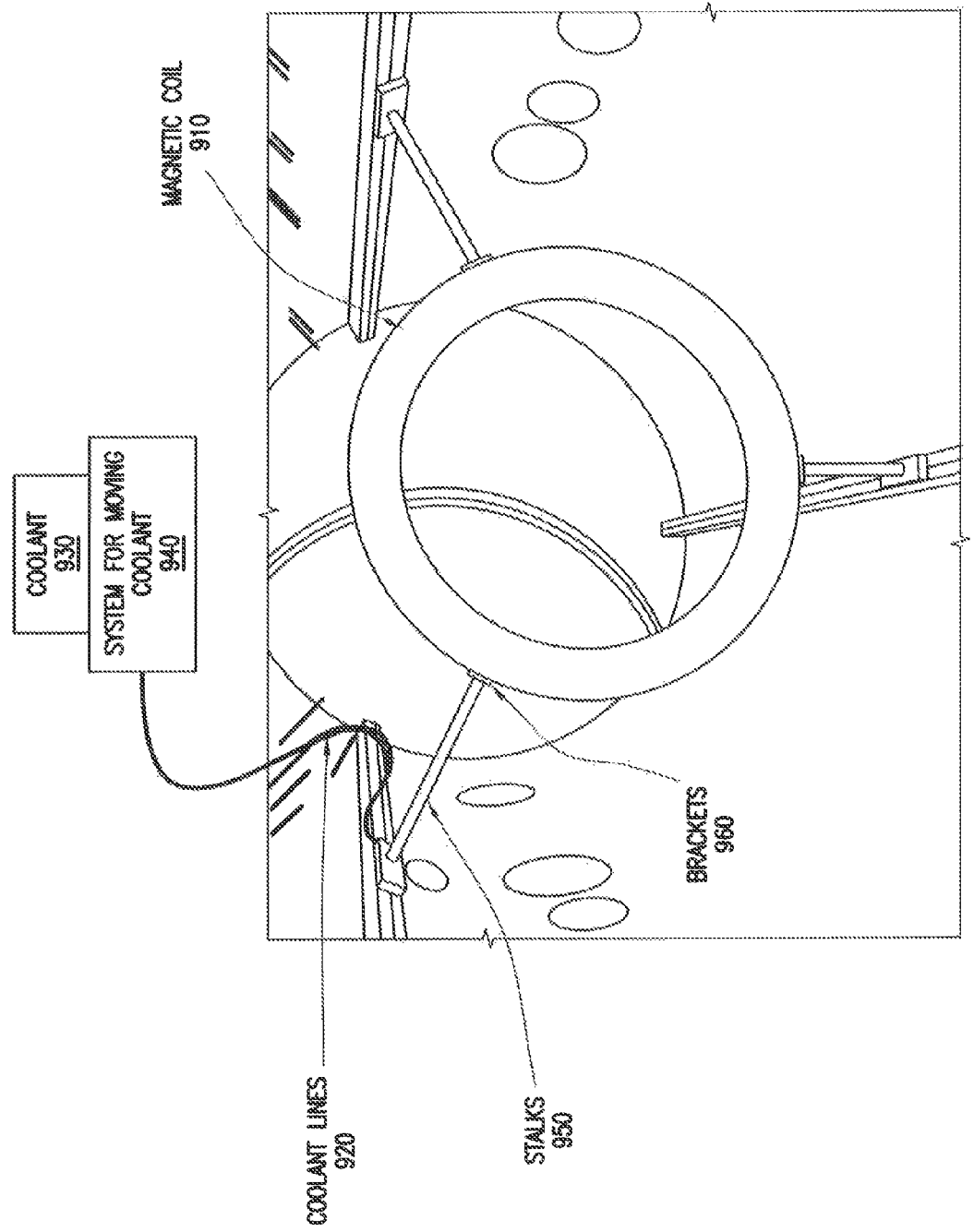
FIG. 9 illustrates an environmental view of a cooling system, in accordance with certain embodiments.

FIG. 9 illustrates an environmental view of a cooling system 200, in accordance with certain embodiments. Cooling system 200 may be operable to remove heat from magnetic coil 910. In some embodiments, cooling system 200 may include cooling lines 920, coolant 930, and a system for moving coolant 940.

In general, the coils of fusion reactor 110 which generate magnetic fields, such as center coil 130, internal coils 140, encapsulating coils 150, and mirror coils 160, may need to be thermally controlled. For example, the coils may be heated ohmicly, by plasma-deposited heat, or by radiative heating. In a vacuum environment, radiative cooling may be ineffective, and conductive cooling paths may be inefficient if the plasma environment is to remain relatively undisturbed. Other internal coil systems that may be magnetically supported have required complex insulated dewers, where the heat gradually builds and eventually terminates operation when it hits limits. Such approaches are very complex and expensive relative to some disclosed embodiments. Some embodiments of the present disclosure provide cooling system 200 which may remove heat from one or more of center coil 130, internal coils 140, encapsulating coils 150, and mirror coils 160.

In some embodiments, cooling system 200 provides for active cooling of center coils 130, internal coils 140, encapsulating coils 150, and mirror coils 160 of fusion reactor 110. In some embodiments, active cooling may allow for constant feedback on the thermal state of the cooled component, providing an important health-monitoring feedback system. Some embodiments of the present disclosure may allow coils to be cooled without breaking vacuum or in steady-state where a coil is continually dumping heat into the coolant.

Magnetic coil 910 may be any coil of fusion reactor 110. For example, magnetic coil 910 may be a center coil 130, an internal coil 140, an encapsulating coil 150, or a mirror coil 160 of fusion reactor 110. In some embodiments, such as those where magnetic coil 910 is an internal coil 140, magnetic coil 910 may be supported by one or more stalks 950. In some embodiments, stalk 950 may have an internal chamber through which cooling lines 920 and other components of fusion reactor 110 may extend. Certain embodiments of stalks 950 are described in more detail herein.

During operation, magnetic coil 910 may be heated ohmically, by plasma-deposited heat, or by radiative heating. In some embodiments, cooling system 200 may operate to keep magnetic coil 910 at a certain temperature or within a certain pre-determined temperature range so that proper operation of magnetic coil 910 within fusion reactor 110 is maintained.

Cooling system 200 may include cooling lines 920. Cooling lines 920 may be any suitable structures. For example, cooling lines 920 may be channels or pipes. Cooling lines 920 may be coupled to a system for moving coolant 940. In some embodiments, cooling lines 920 may be wound inside magnetic coil 910. In some embodiments, cooling lines 920 may carry coolant 930 to the interior of magnetic coil 910. Cooling lines 920 may be coupled to system for moving coolant 940 through support stalks 950 and brackets 960.

Cooling lines 920 may be formed from any suitable material. In some embodiments, cooling lines 920 may be metal-walled pipes or channels. In some embodiments, cooling lines 920 may be isolated from a vacuum through the use of compression fittings and metal walled pipes and fittings.

In some embodiments, cooling lines 920 may be located in the interior of magnetic coil 910. The present disclosure contemplates that magnetic coil 910 may have any suitable number of cooling lines 920 in its interior, Cooling lines 920 may be positioned. within magnetic coil 910 in any suitable arrangement. As one example, and as illustrated below in FIG. 11, cooling lines 920 may be placed inside magnetic coil 910 before a wound coil of wires forming the interior of magnetic coil 910 is inserted. As another example, cooling line 920 may be wound with the wires forming the interior of magnetic coil 910 such that cooling line 920 is located in the middle of the coil of wires. The placement of the cooling line 920 relative to wires within magnetic coil 910 may vary according to particular applications of cooling system 200.

In some other embodiments, cooling line 920 may not be wound within magnetic coil 910, and instead one or more cooling lines 920 may carry coolant 930 to the interior of magnetic coil 910. In such an embodiment, the wires forming the interior of magnetic coil 910 may be bathed in coolant 930. Coolant 930 may be moved through the interior of magnetic coil 910 using system for moving coolant 940 coupled to one or more cooling lines 920. As an example, a first cooling line 920 may deliver fresh coolant to the interior of magnetic coil 910, while a second cooling line 920 may remove previously delivered coolant 930 from the interior of magnetic coil 910, thereby providing a steady flow of coolant 930 through the interior of magnetic coil 910.

Coolant 930 may be any suitable substance, and may vary depending on the particular application of cooling system 200 within fusion reactor 110. As one example, coolant 930 may be liquid nitrogen, liquid helium, helium gas, FLiBe, and the like. In some embodiments, coolant 930 may be selected at least in part based on the material forming magnetic coil 910. For example, coolant 930 may be selected based at least in part because it maintains the superconductive properties of the material forming the shell of magnetic coil 910. In some embodiments, using a coolant 930 that maintains the superconductive properties of the material forming the shell of magnetic coil 910 may advantageously allow for superconductors to be used in steady-state, with small amounts of heat removed steadily, preserving the thermal conditions necessary for operation.

Cooling lines 930 may be coupled to a system for moving coolant 940. The present disclosure contemplates that system for moving coolant 940 may include any suitable arrangement of any suitable components for moving coolant 930 through cooling lines 920. In some embodiments, system for moving coolant 940 may include a pump for actively circulating coolant 930 to a device external to the vacuum of fusion reactor 110 where the heat is removed. In some other embodiments, system for moving coolant 940 may include a reservoir. In such an embodiment, coolant 930 may be passively circulated to a reservoir, also resulting in temperature control.

In general, the operating temperatures of components of fusion reactor 110, such as magnetic coils 910 (which may be immersed in plasma 310), are kept stable by internal cooling lines or channels that may be placed inside. Internal cooling may allow magnetic coils 910, such as center coil 130, internal coils 140, encapsulating coils 150, and mirror coils 160, to be cooled, resulting in more efficient operation. In some embodiments, internal cooling may advantageously allow for superconductors to be used in steady-state, with small amounts of heat removed steadily, preserving the thermal conditions necessary for operation.

Figure 10B:
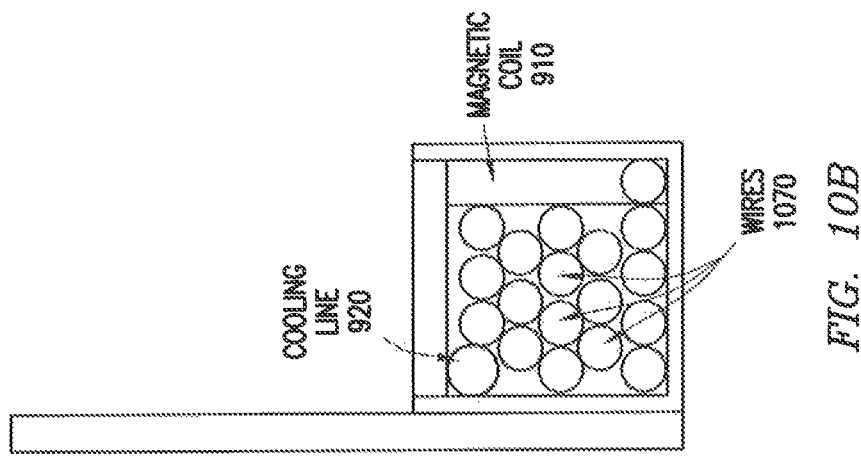
FIGS. 10A and 10B illustrate placement of a cooling line within magnetic coils, in accordance with certain embodiments.
Figure 10A:
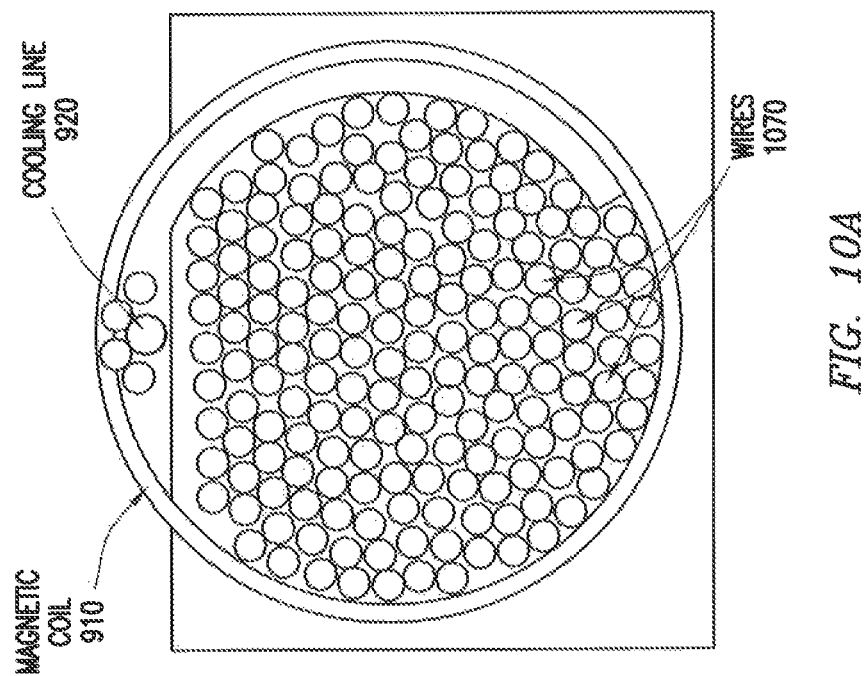

FIGS. 10A and 10B illustrate placement of cooling line 920 within magnetic coil 910, in accordance with certain embodiments. FIG. 10A illustrates an example placement of cooling line 920 within magnetic coil 910. In some embodiments, and as illustrated in FIG. 10A, wires 1070 forming the interior of magnetic coil 910 may have a circular cross section. In some embodiments, wires 1070 in the interior of magnetic coil 910 may be closely packed so that heat flows through wires 1070 to cooling line 920 via conduction. The heat may then be removed from the interior of magnetic coil 910 by coolant 930. Although FIG. 10A shows cooling line 920 positioned in a particular way relative to wires 1070, the present disclosure contemplates that cooling line 920 may be positioned at any suitable location within magnetic coil 910. As an example, cooling line 920 may be wound with the wires 1070 inside magnetic coil 910 such that cooling line 920 is located in the interior of the coil of wound wires 1070.

FIG. 10B shows another example placement of cooling line 920 within magnetic coil 910. In some embodiments, and as illustrated in FIG. 10B, wires 1070 inside magnetic coil 910 may be wound in a manner that results in a square cross section. Cooling line 920 may be operable to remove heat from magnetic coil 910 as described above in relation to FIG. 10A. Although FIG. 10B shows cooling line 920 positioned in a particular way relative to wires 1070, the present disclosure contemplates that cooling line 920 may be positioned at any suitable location within magnetic coil 910.

Figure 11:
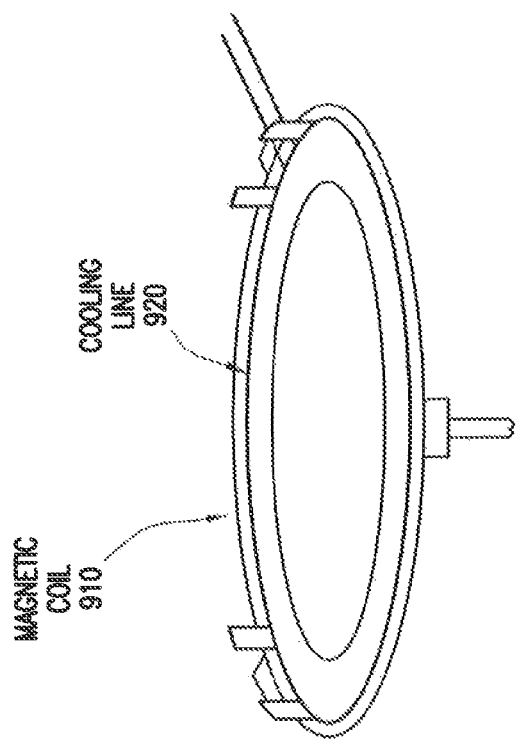
FIG. 11 illustrates the placement of a cooling line in another magnetic coil, in accordance with certain embodiments.

FIG. 11 illustrates the placement of cooling line 920 in magnetic coil 910, in accordance with certain embodiments. In some embodiments, and as illustrated in FIG. 3, during assembly of magnetic coil 910 cooling line 920 may be placed in the coil assembly before the wound coil of wires is inserted. After placement of cooling line 920, the wound coil may be placed on top of cooling line 920 and the remaining components of magnetic coil 910 may be assembled.

Figure 12:
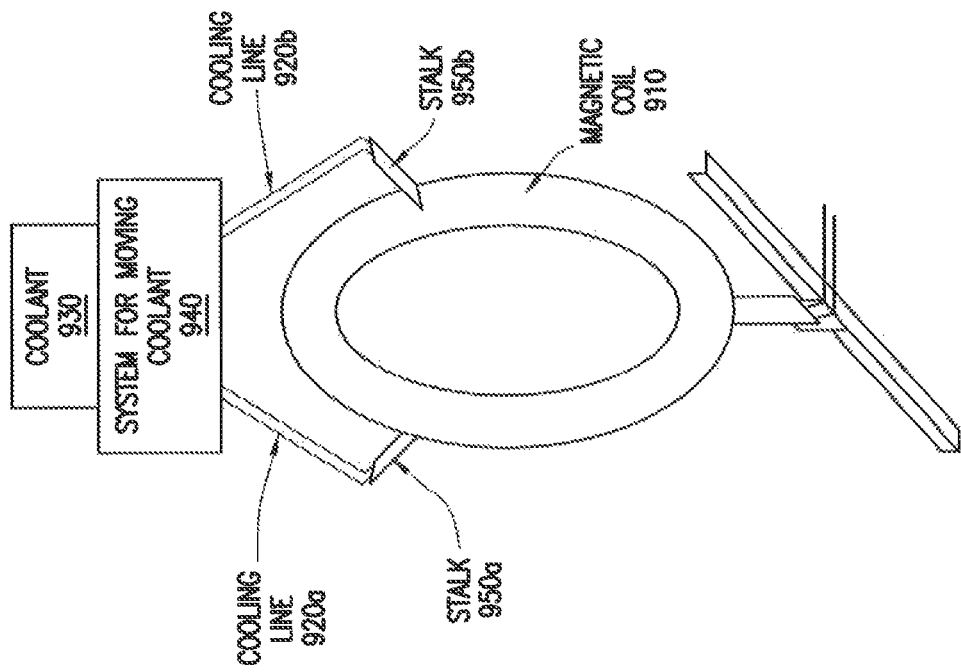
FIG. 12 illustrates a magnetic coil with cooling lines coupled to a system for moving coolant, in accordance with certain embodiments.

FIG. 12 illustrates a magnetic coil 910 with cooling lines 920 coupled to a system for moving coolant 940, in accordance with certain embodiments. As described above in relation to FIG. 9, system for moving coolant 940 may be any suitable arrangement of any suitable components for moving coolant 930 through cooling lines 920. In some embodiments, system for moving coolant 940 may include a pump for actively circulating coolant 930 to a device external to the vacuum where the heat is removed. In some other embodiments, system for moving coolant 940 may include a reservoir. In such an embodiment, coolant 930 may be passively circulated to a reservoir, also resulting in temperature control.

In some embodiments, and as illustrated in FIG. 12, cooling lines 920 may be coupled to system for moving coolant 940. Fresh coolant 930 may enter the interior of magnetic coil 910 through cooling lines 920 via a first stalk 950*a*. As coolant 930 is moved through cooling lines 920 in the interior of magnetic coil 930, it may absorb heat and carry it away from the interior of magnetic coil 910. Coolant 930 carrying heat removed from the interior of magnetic coil 910 may flow through cooling lines 920 via a second stalk 950*b*. In some embodiments, the heat removed from the interior of magnetic coil 910 by coolant 930 may be removed from coolant 930 by system for moving coolant 940 in any suitable manner. After the heat is removed, coolant 930 may cycle back through magnetic coil 910 via first stalk 950*a*.

Although FIG. 12 illustrates cooling lines 920*a* and cooling lines 920*b* entering magnetic coil 910 from separate support stalks 950*a* and 950*b*, the present disclosure contemplates any suitable arrangement of cooling lines 920. As an example, cooling lines 920 delivering coolant to magnetic coil 910 and cooling lines 920 removing coolant from the interior of magnetic coil 910 may travel through the same support stalk 950.

Figure 13:
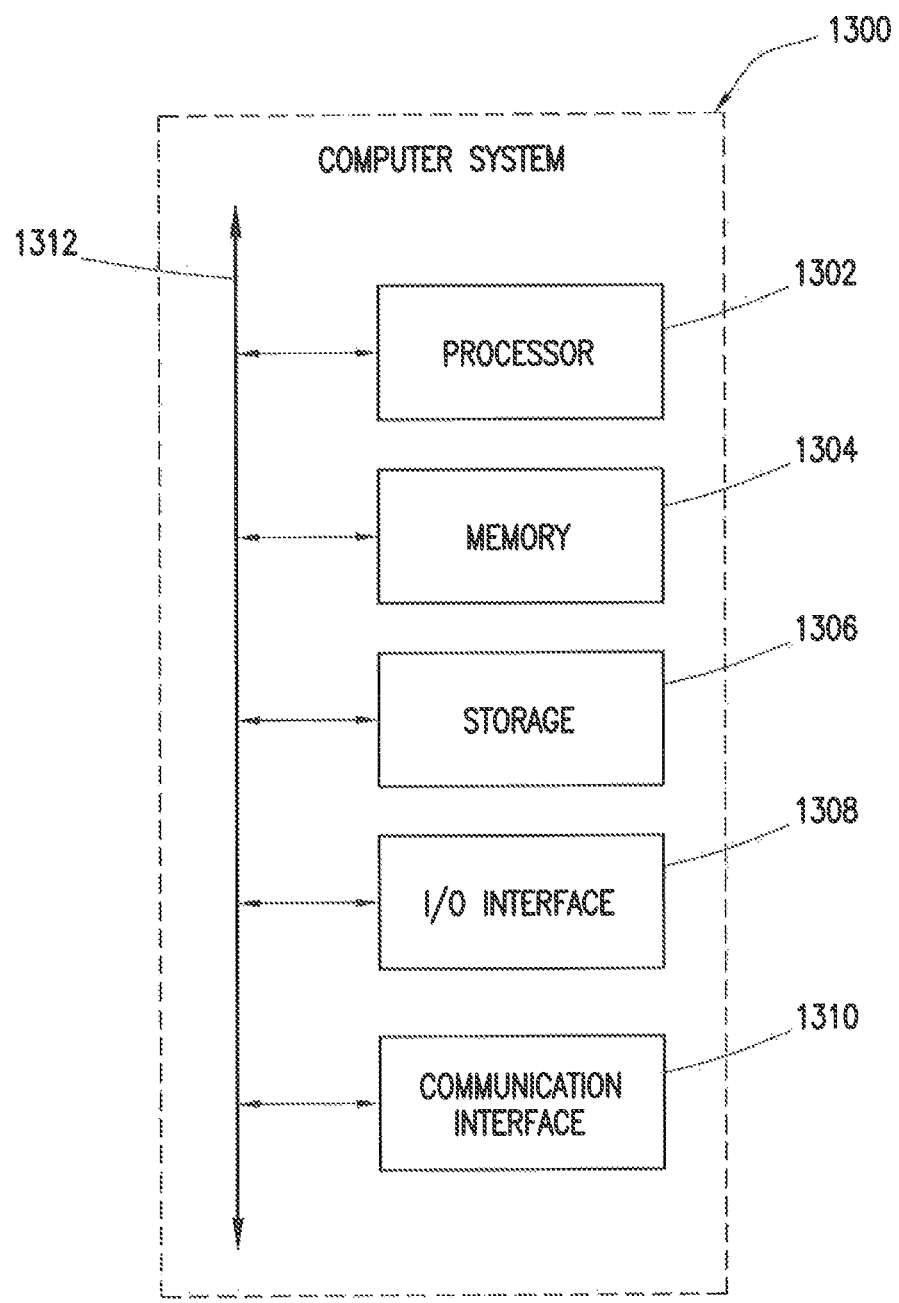
FIG. 13 illustrates an example computer system, according to certain embodiments.

FIG. 13 illustrates an example computer system 1300. In particular embodiments, one or more computer systems 1300 are utilized by fusion reactor 110 for any aspects requiring computerized control. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SEC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USE) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310 where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated. otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system comprising:
   an enclosure comprising:
   a first end and a second end that is opposite from the first end; and
   a midpoint that is substantially equidistant between the first and second ends of the enclosure;
   two superconducting internal magnetic coils suspended within an interior of the enclosure and co-axial with a center axis of the enclosure, the two internal magnetic coils each having a toroidal shape, the two internal magnetic coils comprising:
  a first internal magnetic coil located between the midpoint and first end of the enclosure; and
  a second internal magnetic coil located between the midpoint and the second end of the enclosure;
  wherein the internal magnetic coils each have a radius configured to balance the relative field strength between a plurality of point cusps and a plurality of ring cusps;
a plurality of encapsulating magnetic coils co-axial with a center axis of the enclosure, the encapsulating magnetic coils having a larger diameter than the internal magnetic coils, the plurality of encapsulating magnetic coils comprising:
  at least two first encapsulating magnetic coils located between the midpoint and the first end of the enclosure; and
  at least two second encapsulating magnetic coils located between the midpoint and the second end of the enclosure;
a center magnetic coil co-axial with a center axis of the enclosure and located proximate to the midpoint of the enclosure; and
two mirror magnetic coils co-axial with a center axis of the enclosure and comprising:
  a first mirror magnetic coil located proximate to the first end of the enclosure; and
  a second mirror magnetic coil located proximate to the second end of the enclosure; and
a cooling system configured to remove heat using a coolant from the two internal magnetic coils and one or more of the plurality of encapsulating magnetic coils, the center magnetic coil, and the plurality of mirror magnetic coils; and
one or more coil systems configured to supply the magnetic coils with electrical currents, to form magnetic fields for confining plasma within a magnetized sheath in the enclosure, wherein the magnetized sheath and plasma confined within the magnetized sheath encircle each of the two internal magnetic coils;
wherein the center magnetic coil is disposed outside the interior of the enclosure.

2. The system of claim 1, wherein the cooling system comprises one or more cooling lines within each of the plurality of internal magnetic coils, the plurality of encapsulating magnetic coils, the center magnetic coil, and the plurality of mirror magnetic coils, the cooling lines carrying the coolant operable to remove heat from the magnetic coils.

3. The system of claim 2, wherein the cooling lines are coupled to a system configured to move the coolant and extend from the interior of the plurality of internal magnetic coils, the plurality of encapsulating magnetic coils, the center magnetic coil, and the plurality of mirror magnetic coils, through one or more brackets and one or more support stalks.

4. The system of claim 1, wherein the cooling system comprises a system configured to move the coolant through the interior of the magnetic coils, wherein wires in the interior of the magnetic coils are bathed in the coolant and the coolant is cycled through the interior of the plurality of internal magnetic coils, the plurality of encapsulating magnetic coils, the center magnetic coil, and the plurality of mirror magnetic coils using the system configured to move the coolant.

5. A system comprising:
an enclosure comprising:
  a first end and a second end that is opposite from the first end; and
  a midpoint that is substantially equidistant between the first and second ends of the enclosure;
two superconducting internal magnetic coils suspended within an interior of the enclosure, each internal magnetic coil positioned on an opposite side of the midpoint of the enclosure from the other internal magnetic coil;
wherein the internal magnetic coils each have a radius configured to balance the relative field strength between a plurality of point cusps and a plurality of ring cusps;
one or more encapsulating magnetic coils positioned on each side of the midpoint of the enclosure, each encapsulating magnetic coil being coaxial with the internal magnetic coils; and
two mirror magnetic coils coaxial with the internal magnetic coils, each mirror magnetic coil positioned on an opposite side of the midpoint of the enclosure from the other mirror magnetic coil;
a center magnetic coil co-axial with a center axis of the enclosure and located proximate to the midpoint of the enclosure;
one or more coil systems configured to supply the magnetic coils with electrical currents, to form magnetic fields for confining plasma within a magnetized sheath in the enclosure, wherein the magnetized sheath and plasma confined within the magnetized sheath encircle each of the two internal magnetic coils; and
one or more cooling lines within each of the internal magnetic coils, the cooling lines configured to carry a coolant and remove heat from the internal magnetic coil;
wherein the center magnetic coil is disposed outside the interior of the enclosure.

6. The system of claim 5, wherein the cooling lines extend from the interior of the internal magnetic coils, through one or more brackets and one or more support stalks, to a system configured to move the coolant through the cooling lines.

7. The system of claim 5, wherein the coolant, when removing heat from the internal magnetic coils, maintains the superconductive properties of one or more materials forming the internal magnetic coils.

8. The system of claim 5, wherein the one or more cooling lines are isolated from a vacuum by one or more of compression fittings or metal walled pipes and fittings.

9. The system of claim 1, wherein the two mirror magnetic coils comprise a first and second mirror magnetic coils disposed on opposite sides of the center magnetic coil.

10. The system of claim 1, wherein the one or more coil systems comprise:
  a center coil system configured to supply first electrical currents flowing in a first direction through the center magnetic coil;
  an internal coil system configured to supply second electrical currents flowing in a second direction through each of the two internal magnetic coils;
  an encapsulating coil system configured to supply third electrical currents flowing in the first direction through each of the plurality of encapsulating magnetic coils; and
  a mirror coil system configured to supply fourth electrical currents flowing in the first direction through each of the two mirror magnetic coils.

11. The system of claim 1, wherein each of the two internal magnetic coils comprise at least a first shielding surrounding the internal magnetic coil and each of the two internal magnetic coils is suspended within the enclosure by at least one support.

12. The system of claim 5, wherein the one or more coil systems comprise:
- a center coil system configured to supply first electrical currents flowing in a first direction through the center magnetic coil;
- an internal coil system configured to supply second electrical currents flowing in a second direction through each of the two internal magnetic coils;
- an encapsulating coil system configured to supply third electrical currents flowing in the first direction through each of the plurality of encapsulating magnetic coils; and
- a mirror coil system configured to supply fourth electrical currents flowing in the first direction through each of the two mirror magnetic coils.

13. The system of claim 1, wherein each of the two internal magnetic coils comprise at least a first shielding surrounding the internal magnetic coil and each of the two internal magnetic coils is suspended within the enclosure by at least one support.

* * * * *

UNITED STATES PATENT AND TRADEMARK OFFICE
CERTIFICATE OF CORRECTION

Page 1 of 1

PATENT NO. : 9,928,926 B2
APPLICATION NO. : 14/242912
DATED : March 27, 2018
INVENTOR(S) : Thomas John McGuire It is certified that error appears in the above-identified patent and that said Letters Patent is hereby corrected as shown below:

In the Claims

Column 20, Line 36: After "coil" and before ";" add "s".

Signed and Sealed this
Twenty-fifth Day of February, 2020

Andrei Iancu
*Director of the United States Patent and Trademark Office*